(12) United States Patent
Kostic et al.

(10) Patent No.: US 12,057,737 B2
(45) Date of Patent: Aug. 6, 2024

(54) HYBRID PERMANENT MAGNET—ELECTROMAGNET MAGNETIC FLUX DEVICE

(71) Applicant: Aeroflux Braking Systems Inc., Toronto (CA)

(72) Inventors: Nikola Kostic, Toronto (CA); Stevan Kostic, Toronto (CA)

(*) Notice: Subject to any disclaimer, the term of this patent is extended or adjusted under 35 U.S.C. 154(b) by 235 days.

(21) Appl. No.: 17/843,574

(22) Filed: Jun. 17, 2022

(65) Prior Publication Data

US 2023/0076367 A1    Mar. 9, 2023

Related U.S. Application Data

(60) Provisional application No. 63/211,815, filed on Jun. 17, 2021.

(51) Int. Cl.
| | | |
|---|---|---|
| *H02K 1/17* | (2006.01) | |
| *H01F 7/02* | (2006.01) | |
| *H01F 7/20* | (2006.01) | |

(52) U.S. Cl.
CPC ............. *H02K 1/17* (2013.01); *H01F 7/021* (2013.01); *H01F 7/0231* (2013.01); *H01F 7/20* (2013.01)

(58) Field of Classification Search
CPC ...... H02K 1/17; H02K 21/24; H02K 2213/09; H02K 1/14; H01F 7/021; H01F 7/0231; H01F 7/20
See application file for complete search history.

(56) References Cited

U.S. PATENT DOCUMENTS

| | | | |
|---|---|---|---|
| 7,226,018 B2 | 6/2007 | Sullivan | |
| 8,201,774 B2 | 6/2012 | Gieras et al. | |
| 9,638,273 B2 | 5/2017 | Schmidt | |
| 10,454,341 B1 | 10/2019 | Grundman et al. | |
| 2008/0105503 A1 | 5/2008 | Pribonic | |
| 2009/0186535 A1 | 7/2009 | Sullivan | |

(Continued)

FOREIGN PATENT DOCUMENTS

| | | |
|---|---|---|
| CN | 110707900 A | 1/2020 |
| JP | 2016171727 A | 9/2016 |

(Continued)

OTHER PUBLICATIONS

He, Ren, et al.; Brake Performance Analysis of ABS for Eddy Current and Electrohydraulic Hybrid Brake System' Mathematical Problems in Engineering Sep. 24, 2013.

(Continued)

*Primary Examiner* — Mohamad A Musleh
(74) *Attorney, Agent, or Firm* — David J. Greer; Smart & Biggar LP

(57) ABSTRACT

A hybrid permanent magnet-electromagnet flux device including a plurality of electromagnets and permanent magnets cooperatively arranged to provide a first magnetic array such that when the electromagnets are activated in a first state the first magnetic array of magnets implements a Halbach array generating an augmented magnetic field on a first side of the first magnetic array and a cancelling magnetic field on opposite facing second side of the first magnetic array, and when the electromagnets are activated in a second state a respective magnetic field orientation of each of the electromagnets is reversed from that of the first state.

19 Claims, 36 Drawing Sheets

(56) References Cited

U.S. PATENT DOCUMENTS

| | | |
|---|---|---|
| 2015/0204399 A1 | 7/2015 | Schmidt |
| 2015/0300432 A1 | 10/2015 | Yamaguchi |
| 2018/0278134 A1 | 9/2018 | Hunstable |
| 2019/0135115 A1 | 5/2019 | Savoie-Lavigueur |
| 2020/0300310 A1 | 9/2020 | Kostic et al. |

FOREIGN PATENT DOCUMENTS

| | | | |
|---|---|---|---|
| KR | 20170058627 A | * | 5/2017 |
| WO | 2016029060 A1 | | 2/2016 |

OTHER PUBLICATIONS

Gay, S., et al.; Analysis and Experimental Testing of a Permanent Magnet Eddy-Current Brake 2005.

Gay, S. et al.; Parametric Analysis of Eddy-Current Brake Performance by 3-D Finite-Element Analysis Feb. 2006.

Gulbahce, M. O., et al.; Finite elements analysis of a small power eddy current brake Jan. 2012.

Gulbahce, M.O., et al.; Determination of the Effect of Conductive Disk Thickness on Braking Torque for a Low Power Eddy Current Brake May 2013.

Axial Retarders; Ateco Equipment; As early as Jul. 17, 2020, https://www.atecoequipment.com.au/products/telma/axial-retarders/; 4 pages 2020.

Telma Retarders; Ateco Equipment; As early as Jul. 17, 2020, https://www.atecoequipment.com.au/products/telma/; 9 pages 2020.

Focal Retarders; Ateco Equipment; As early as Jul. 17, 2020, https://www.atecoequipment.com.au/products/telma/focal-retarders/; 5 pages 2020.

Telma USA; As early as Jul. 17, 2020, https://www.telmausa.com/products/operating-principle; 2 pages 2020.

* cited by examiner

HYBRID PERMANENT MAGNET—ELECTROMAGNET MAGNETIC FLUX DEVICE

RELATED APPLICATIONS

The present disclosure claims priority to and benefit of United States Provisional Patent Application No. 63/211,815, filed Jun. 17, 2021, the contents of which are incorporated herein by reference.

FIELD OF THE INVENTION

The present disclosure relates to a hybrid permanent magnet-electromagnet magnetic flux device. More specifically, the present disclosure relates to a mixed permanent magnet-electromagnetic array capable of producing and controlling an augmented magnetic field.

BACKGROUND

Permanent magnets are objects which are made from a distinct set of materials which have the property of being intrinsically magnetized. They will continuously emanate a magnetic field due to their internal atomic structure. Ferromagnetic materials, including iron, nickel, cobalt and their alloys, some alloys of rare-earth metals, and some naturally occurring minerals, are all strongly attracted to magnets and furthermore can be magnetized in such a way as to cause them to become permanent magnets.

However, permanent magnets also have the potential to demagnetize due to a variety of causes. A permanent magnet may experience a demagnetizing effect due to numerous possible causes including, for example, passage of time, being dropped and banged repeatedly, or being exposed to a temperature past the magnetic material's Curie point. The Curie point refers to the critical temperature above which permanent magnets lose their magnetic properties, however demagnetizing effects can also be seen at lower temperatures and they simply intensify and become permanent as the Curie point is approached and subsequently exceeded.

Electromagnets are another type of magnet. In electromagnets, the magnetic field generated is induced by an electric current. The most common form of electromagnet consists of a wire (usually copper) wrapped in a coil around a ferromagnetic core. Electric current is passed through the wire and, as a result, a magnetic field is generated around the coil. The main advantage of using an electromagnet over a permanent magnet is that the magnetic field can quickly and easily be turned on or off, and its strength can be altered as desired. By changing the amount and direction of the current flowing through the coil, both the field itself and its strength can be modified accordingly. Additionally, the magnetic field can be removed entirely by switching off the supply of current to the coil.

The arrangement of permanent magnets in arrays can directly influence their effective magnetic field distribution. A Halbach array arranges magnets such that the magnetic field is relatively concentrated on a single side (hereby referred to as the strong side, which can be considered a working face of the array), while simultaneously reducing the magnetic field on the opposing side (hereby referred to as the weak side, which can be considered a non-working face of the array). In the ideal scenario, the superposition of magnetic fields from the individual magnetic components of the Halbach array would result in a field on the working face of the array with double the strength of a typical magnet array. At the same time, the magnetic fields from the individual magnets would cancel out on the non-working face, resulting in no overall field on that side of the array. However, in actuality, this ideal case does not occur. Rather, while the effective magnetic flux seen on the working face of the array is increased in a Halbach arrangement, it is augmented to a lesser degree than it would be in the ideal case, and while the magnetic flux on the non-working face of the array is minimized, it can never be entirely eliminated. Also, it is a common misconception that the non-working face exhibits a true cancelling out of the magnetic field. Instead, what occurs is that the magnetic flux is simply contained within the magnetic alloy rather than being emanated outwards. Thus, a Halbach array is a special arrangement of magnets that augments the magnetic field on one side of the array while cancelling the field to near zero on the other side, resulting in a magnetic array that has opposite-facing strong and weak sides. This inherent self-shielding property of the Halbach array provides an additional practical benefit to its use by eliminating the need for excessive magnetic shielding on the weak side of the magnetic array to prevent interference with any nearby electrical components or systems.

A linear Halbach array is formed by first lining up a series of identically sized and shaped magnets (typically cuboid) in a straight line with their north poles aligned in a direction perpendicular to the longitudinal axis of the row. The first magnet in the row is maintained at its current orientation. Then, each subsequent magnet in the line is rotated about an axis running through the centroid of the respective magnet and perpendicular to the longitudinal axis of the row. Each of these magnets is rotated such that their north pole is swept 90 degrees about this axis relative to the north pole of the immediately preceding magnet. The rotation of each magnet can either be towards or away from the previous magnet, however the choice of direction must be consistent from the second to the last magnet in the array. This produces a strong magnetic field on one side of the array and a substantially weaker magnetic field on the opposite side of the array (i.e. a one-sided magnetic flux). The direction of the one-sided magnetic flux can be reversed through the alteration of the magnetic orientations of the individual magnet constituents of the array. Although the potential use cases of a one-sided magnetic flux distribution might seem rather abstract upon first mention, there exist plenty of relevant applications. Uses can vary greatly ranging from refrigerator magnets to industrial applications such as DC motors to more high-tech applications such as particle accelerators.

A circular (or circumferential) Halbach array consists of a ring arrangement of magnets, which together form a circular pattern. The end result of such an array is a highly uniform and dense magnetic field—both of which are highly desirable properties for use in certain applications. The array must be put together using a series of individual magnets and the general understanding is that an increasing number of discrete magnets used for a given size of array creates an increasingly more uniform magnetic field. Availability, ease of production, and ease of assembly are all considerations that must be made when deciding the shape of the individual magnets to be used. Most commonly, arc shaped (or trapezoidal) segments are regarded as a strong design choice, however assemblies of tightly packed small rods with circular, hexagonal, or other cross sections may be preferred under certain circumstances. Similarly to the linear Halbach array, the circular Halbach array operates under the principle of varying the magnetic orientation of adjacent magnets in a repeatable pattern. Commonly, the arrays can be arranged as quadrupoles, hexapoles, sextupoles, and octupoles, each referring to the number of distinct magnetic orientations which comprise the array. For quadrupoles, in order to obtain a strong magnetic field, one should choose either 12 or 16 individual magnets to build the array. Of course, much like the linear arrays, by altering the magnetic orientations within the array, circular arrays can also be reversed such that the reinforced magnetic field acts in the opposite direction. Some applications include brushless AC motors, magnetic couplings, and high-field cylinders.

A Halbach array may be comprised of both permanent magnets and electromagnets. Typically, it is desirable to decrease the number of electromagnets used in a Halbach array in lieu of using permanent magnets for two reasons: electromagnets are heavier, and they require power to operate. Some applications of Halbach arrays are insensitive to the added weight, however for other applications lightweight designs may be extremely desirable, if not essential. The requirement of a constant electric current being supplied to the electromagnets when the array is operational requires external power to be provided, which also introduces further complexity into the system and increases the chances of failures occurring in the associated electronic components, such as the power supply.

The nature of Halbach arrays can lead to difficulties in terms of assembling their geometry during production. Due to the fact that the individual magnetic elements are oriented in such a fashion that they will repel neighboring elements, a number of potential complications become apparent. Namely, both combating these repulsion forces while assembling the array and ensuring that the assembly will stay intact throughout its use are imperative. Halbach arrays also exhibit problems with demagnetization since elements within the array will exert a demagnetizing field on one another. However, this is only true if the Halbach array is in continuous use.

Due to the one-sided magnetic flux attainable through the use of a Halbach array, the potential for its implementation as part of an electromagnetic eddy current braking system is significant.

BRIEF SUMMARY

Various implementations of a hybrid permanent magnet-electromagnet magnetic flux device are provided in this disclosure.

According to one aspect, of a hybrid permanent magnet-electromagnet flux device it includes a plurality of electromagnets and permanent magnets cooperatively arranged to create a first magnetic array such that when the electromagnets are activated in a first state the first magnetic array implements a Halbach array generating an augmented magnetic field on a first side of the first magnetic array and a cancelling magnetic field on the opposite facing second side of the first magnetic array, and when the electromagnets are activated in a second state a respective magnetic field orientation of each of the electromagnets is reversed from that of the first state.

In at least some implementations, the hybrid permanent magnet-electromagnet flux device includes a controller configured to selectively cause the electromagnets to be placed in one of: the first state, the second state, or a neutral state, wherein in the neutral state the electromagnets are not activated (i.e. no current is supplied to them).

In one or more of the preceding aspects, in the plurality of electromagnets and permanent magnets are cooperatively arranged such that when the electromagnets are activated in the second state the first magnetic array implements a cancelling magnetic field on the first side of the first magnetic array.

In one or more of the preceding aspects, the plurality of electromagnets and permanent magnets are cooperatively arranged such that when the electromagnets are activated in the second state the first magnetic array implements a Halbach array generating an augmented magnetic field on the second side of the first magnetic array.

In one or more of the preceding aspects, the first magnetic array has the same number of electromagnets and permanent magnets, and the electromagnets and permanent magnets are radially arranged in an alternating pattern to form a circular surface at the first side of the first magnetic array.

In one or more of the preceding aspects, the first magnetic array has a total of eight of the electromagnets and eight of the permanent magnets or, in other aspects, the first magnetic array has a number of electromagnets and a number of permanent magnets according to a ratio of 1 electromagnet:1 permanent magnet.

In one or more of the preceding aspects, the first magnetic array has a total of four of the electromagnets and twelve of the permanent magnets or, in other aspects, the first magnetic array has a number of electromagnets and a number of permanent magnets according to a ratio of 1 electromagnet:3 permanent magnets.

In one or more of the preceding aspects, the first magnetic array has a total of four of the electromagnets and 24 of the permanent magnets or, in other aspects, the first magnetic array has a number of electromagnets and a number of permanent magnets according to a ratio of 1 electromagnet:6 permanent magnets.

In one or more of the preceding aspects, at least some of the electromagnets have a respective permanent magnet embedded into their ferromagnetic core thereof and oriented to augment the magnetic field on the first side of the array.

In one or more of the preceding aspects, at least some of the electromagnets are modular units with a detachable side to enable the orientation of the permanent magnet embedded in the ferromagnetic core to be manually reversed.

In one or more of the preceding aspects, the plurality of electromagnets and permanent magnets are cooperatively arranged to provide a second magnetic array in back to back alignment with the first magnetic array, such that when the electromagnets are activated in the first state the second magnetic array implements a second Halbach array generating an augmented magnetic field on a first side of the second magnetic array that faces in an opposite direction than the first side of the first magnetic array and a cancelling magnetic field on a second side of the second first magnetic array that faces the second side of the first magnetic array.

In one or more of the preceding aspects, a first set of the permanent magnets form part of the first magnetic array and a second set of the permanent magnets form part of the second magnetic array, the plurality of electromagnets being double-sided electromagnets that each have a first electromagnet side forming part of the first magnetic array and a second electromagnet side forming part of the second magnetic array.

In one or more of the preceding aspects, the first magnetic array is formed from an equal number of the permanent magnets and first electromagnet sides of the electromagnets, and the second magnetic array is formed from the same equal number of the permanent magnets and second electromagnet sides of the electromagnets, a total number of the electromagnets included in the plurality of electromagnets and permanent being half that of the permanent magnets.

In one or more of the preceding aspects, the plurality of electromagnets and permanent magnets being cooperatively arranged such that each of the first magnetic array and the second magnetic array are circumferential arrays.

In one or more of the preceding aspects, the plurality of electromagnets and permanent magnets are arranged such that each of the first magnetic array and the second magnetic array are linear arrays.

In one or more of the preceding aspects, the plurality of electromagnets and permanent magnets are cooperatively arranged to provide a third magnetic array in back to back alignment with a fourth magnetic array, the third and fourth magnetic arrays being linear arrays in orthogonal alignment with the first and second magnetic arrays, such that when the electromagnets are activated in the first state: the third magnetic array implements a third Halbach array generating an augmented magnetic field on a side of the third magnetic array that faces in an orthogonal direction of the first side of the first magnetic array and the first side of the second magnetic array; and the fourth magnetic array implements a fourth Halbach array generating an augmented magnetic field on side of the fourth magnetic array that faces in an opposite direction that the third Halbach array. In one or more of the preceding aspects, the plurality of electromagnets and permanent magnets are arranged on a stator that is configured to be secured to a structure.

According to a further aspect, a method is disclosed of operating a hybrid permanent magnet-electromagnet flux device that comprises a plurality of electromagnets and permanent magnets cooperatively arranged to provide a first magnetic array such that when the electromagnets are activated in a first state the first magnetic array of magnets implements a Halbach array generating an augmented magnetic field on a first side of the first magnetic array and a cancelling magnetic field on opposite facing second side of the first magnetic array, and when the electromagnets are activated in a second state a respective magnetic field orientation of each of the electromagnets is reversed from that of the first state. The method comprises: applying current in one direction to induce a first polarity to the plurality of electromagnets to activate the electromagnets in the first state; and applying current in the reverse direction to induce an opposing polarity to activate the electromagnets in the second state.

According to a further example aspect, a mixed permanent magnet-electromagnetic array is disclosed that includes elements of varying magnetic orientations with the ability to generate and control an augmented magnetic field. The array is arranged in such a way as to create a circumferential or linear Halbach array. As such, the magnetic array is capable of producing a strong magnetic field in one direction (i.e. the working face) substantially perpendicular to the magnets while producing an almost negligible field in the opposite direction (i.e. the non-working face). The working face of the magnetic field can be directed towards the operational side within an electrical machine when the system is desired to be in the 'ON' state. In the case where the non-working face of the magnetic field is directed towards the operational side, since the magnetic flux in that direction would be negligible, the system will be in the 'OFF' state. Control over these 'ON' and 'OFF' states respectively is completed by reversing the direction of electric current flowing through the electromagnets in the array, which in turn reverses their polarity and ultimately reverses the direction of the enhanced magnetic field created by the overall array. In a third scenario, when the electromagnets are turned off, either intentionally or as a result of electrical failure, the magnetic array is not in either the 'ON' or 'OFF' state, but rather is in a third 'NEUTRAL' state. In this state, as a fail-safe mechanism, the remaining permanent magnets create a magnetic field which remains substantially parallel to the face of the array. While comparably lower than with the functioning array, a residual magnetic field will still be generated and will be able to provide limited functionality. The placement of additional permanent magnets within the electromagnet cores can further improve performance in the 'NEUTRAL' state at the expense of being able to effect near complete disengagement in the 'OFF' state.

BRIEF DESCRIPTION OF THE DRAWINGS

Some embodiments of the present disclosure are illustrated as an example and are not limited by the figures of the accompanying drawings, in which like references may indicate similar elements, parts, assemblies, or concepts, and in which.

DETAILED DESCRIPTION

Figure 1:
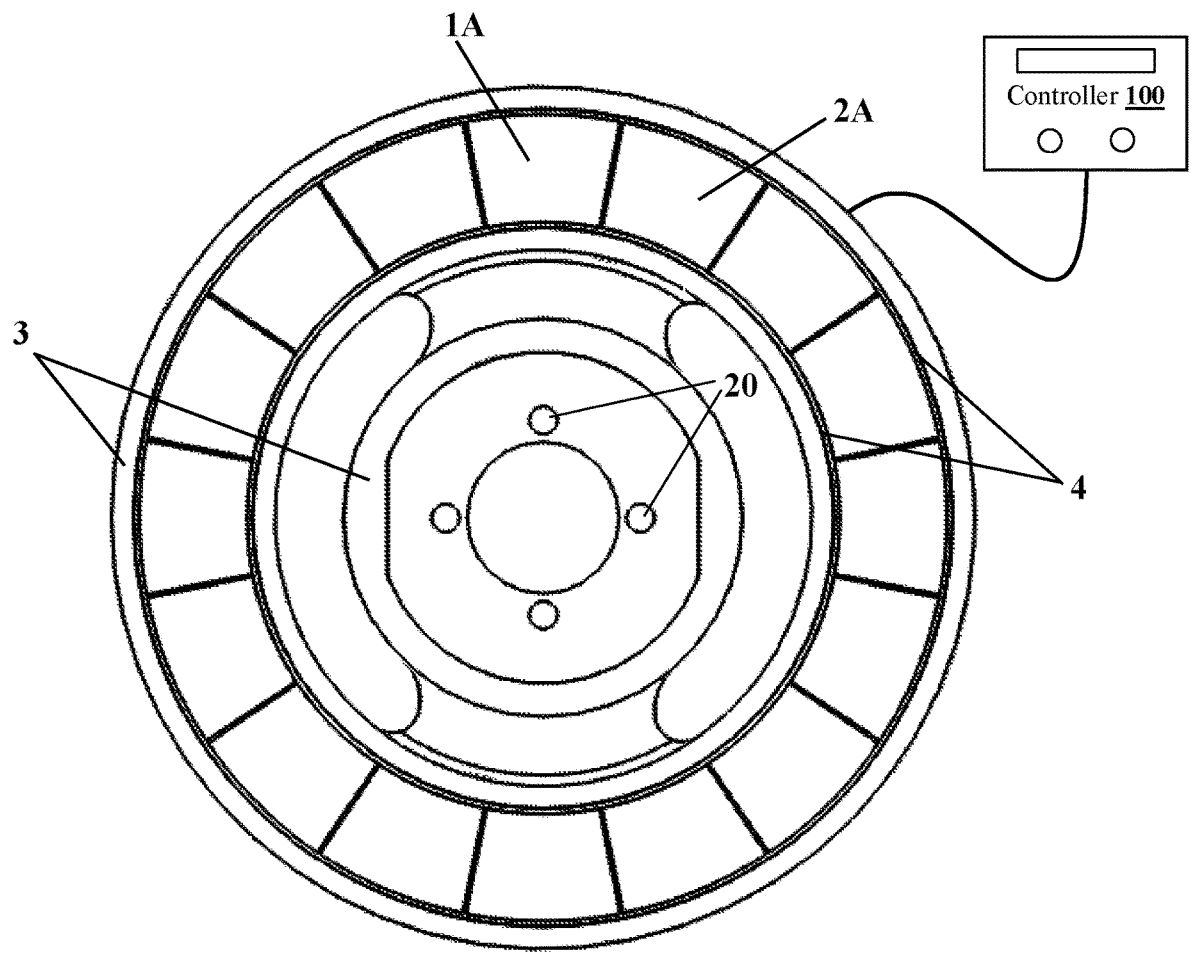
FIG. 1 depicts a front view of a circumferential magnetic array comprised of both permanent magnets and four electromagnets affixed to a stator, according to an example implementation of the disclosure.

The terminology used herein is for the purpose of describing particular embodiments only and is not intended to be limiting of the disclosure. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising" and/or "may be", when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In the following description, for purposes of explanation, some specific details are set forth in order to provide as thorough an understanding of the present disclosure as possible. It will be evident, however, to one skilled in the art that the present disclosure may be practiced without these specific details. The present disclosure is to be considered as an exemplification and is not intended to limit the scope of the disclosure to the specific embodiments illustrated by the figures or descriptions below.

The present disclosure will now be described by general explanation and by referencing the appended figures representing example implementations. Some figures are labelled while some figures are described holistically with reference to self-evident components or assemblies shown in the figures. For all non-labelled figures, the components or assemblies shown in the figures will have been labelled in previous figures of the same components or assemblies and will be immediately obvious. For all other figures, the components or assemblies discussed will be evident to one skilled in the art.

Example implementations of the present disclosure are directed to a hybrid permanent magnet-electromagnet magnetic flux device, which can create and control an augmented magnetic field. In the present disclosure, multiple embodiments of this array are discussed, each containing a modification(s) relative to one of the previous embodiments aimed at improved performance or a different use case.

In some embodiments of the present disclosure (see for example the implementations illustrated in FIGS. 1 to 7) the magnetic array consists of permanent magnets and electromagnets in a 3:1 ratio (e.g., 12 permanent magnets to 4 electromagnets for a total of 16 magnetic components) together forming a circumferential array. In some embodiments, the ratio of permanent magnets and electromagnets can be other amounts, including for example a 6:1 ratio (e.g., 24 permanent magnets to 4 electromagnets for a total of 18 magnetic components), or a 4:1 ratio, or other ratio.

In some embodiments of the present disclosure, the radial arrangement of magnets is such that when the electromagnets are energized with current in a first direction, the magnetic orientation of the individual constituents results in formation of a Halbach array with a magnetic field formed on one side (i.e., a Halbach array strong side) of the magnetic array and in a direction substantially perpendicular to the face of the magnets. The augmented face magnetic field can therefore be directed to be a desired direction relative to a side of the magnetic array, herein referred to as the operational side of the magnetic array, while the weaker magnetic field ban be directed to an opposite, non-operational, side. When the working face (i.e., a Halbach array strong side) of the resulting augmented magnetic field is formed on the operational side, this is representative of the 'ON' state for the magnetic array. In some embodiments of the present disclosure, the magnetic orientation of the electromagnets can be flipped (reversed) such that the side which was previously a working face of the magnetic array (i.e., the Halbach array strong side) becomes a non-working face (i.e., the Halbach array weak side) (see for example the magnetic array shown in FIGS. 13 to 15).

When the magnetic orientation of the electromagnets is reversed such that the operational side of the array ceases to be a Halbach array strong side, this is representative of the 'OFF' state as a very minimal magnetic flux (e.g., a magnetic flux that is negligible relative to the augmented magnetic field formed in the 'ON' state) will be produced from what is effectively a non-existent magnetic field on that side of the magnetic array. In some embodiments of the present disclosure, there also exists a 'NEUTRAL' state which serves the purpose of providing limited functionality for the magnetic array, even when the electromagnets are not functioning. In such a scenario, the electromagnets would no longer exhibit any magnetism meaning that the permanent magnets which comprise a certain portion of the magnetic array would be the only components of the magnetic array producing a magnetic field. In some embodiments of the present disclosure, the magnetic array with only the permanent magnets functioning as intended would result in a magnetic field that is substantially parallel to the face of the magnets. This would have the effect of a residual magnetic flux being emanated, providing limited functionality of the magnetic array.

Figure 13:
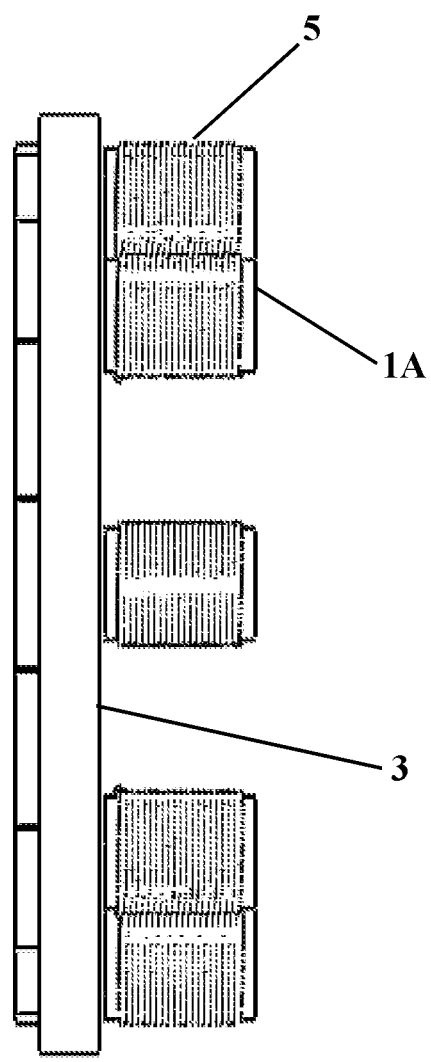
FIG. 13 depicts a side view of a circumferential magnetic array comprised of permanent magnets and eight electromagnets affixed to a stator, according to a further example implementation of the present disclosure, showing five of the eight electromagnets.
Figure 14:
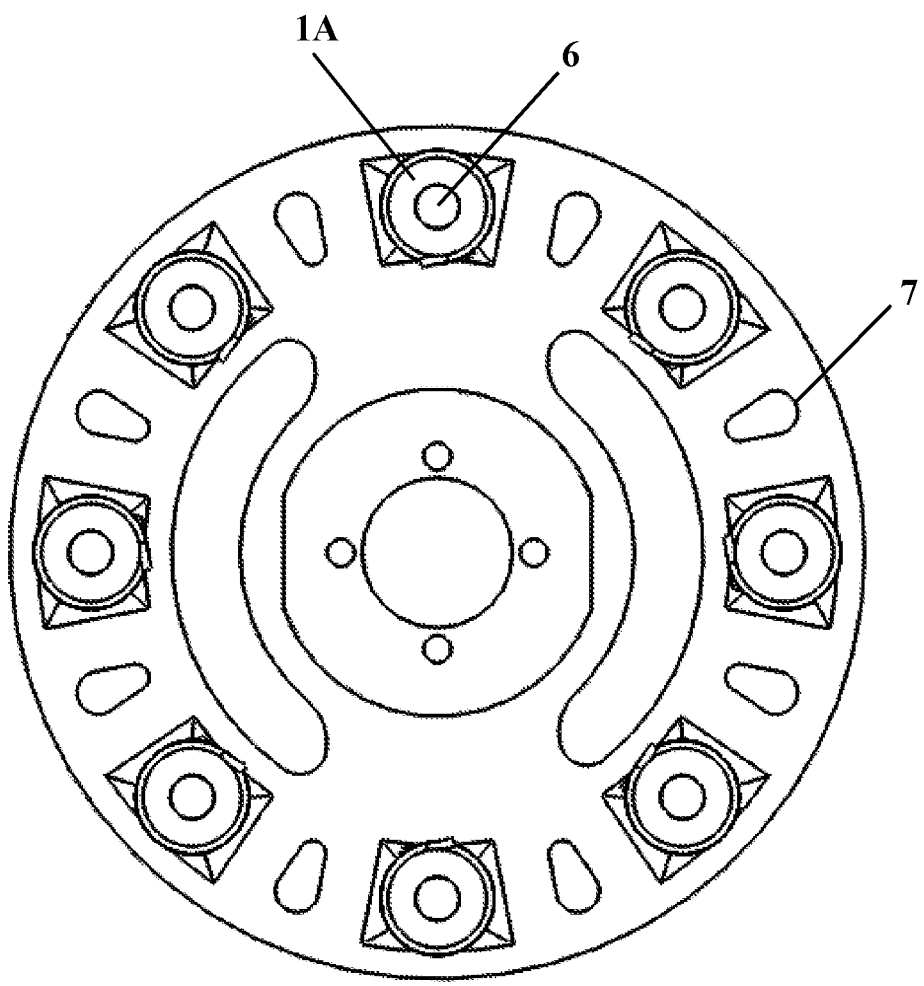
FIG. 14 depicts a back view of the circumferential magnetic array of FIG. 13, illustrating small permanent magnets housed in holes formed in the ferromagnetic cores of the respective electromagnets.
Figure 15:
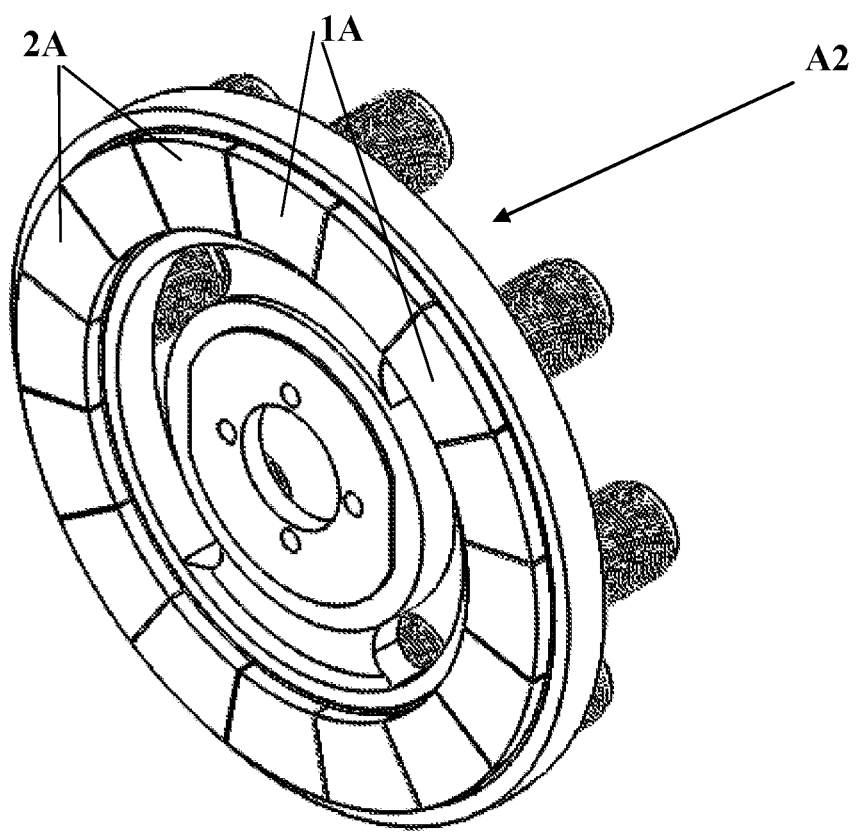
FIG. 15 depicts an isometric view of the circumferential magnetic array of FIG. 13.

In some embodiments of the present disclosure, a 1:1 ratio of permanent magnets to electromagnets (8 permanent magnets to 8 electromagnets for a total of 16 magnetic components) is implemented (see for example the implementations illustrated in FIGS. 13 to 15). The added electromagnets may resolve better disengagement of the magnetic array when the 'OFF' state is desired as the additional magnets enable the operational side of the magnetic array A2 to implement a complete Halbach array weak side and the non-operational side to implement a complete Halbach array strong side, whereas in the embodiments of FIGS. 1 to 7, reversing the magnetic orientations of the 4 electromagnets 1A (as arranged among the 12 permanent magnets 2A) will not result in a rotational pattern of the magnetism that will effect a Halbach array.

In some embodiments of the present disclosure, a hole is machined or otherwise provided into the ferromagnetic core of each of the electromagnets in the magnetic array, where a small permanent magnet is inserted. The benefits of these additional permanent magnets are two-fold. Firstly, when the magnetic array is activated in first state and desired to be in the 'ON' position, the permanent magnets will be oriented in such a fashion as to complement the existing magnetic field acting towards the operational side. Of course, since the magnetic orientation of the small permanent magnets housed within the ferromagnetic cores cannot be reversed as can be done for the electromagnets themselves, the small permanent magnets will continue to apply a magnetic field towards the operational side even when the magnetic array is intended to be in its 'OFF' state. However, due to the relative strength of the electromagnets compared to the small permanent magnets, the field emanated by the small permanent magnets will be cancelled out and will not provide any magnetic flux towards the operational side in the 'OFF' state. However, using the same logic, the benefit of such a configuration is that the fail-safe nature of the magnetic array is improved when it is in its 'NEUTRAL' state due to the fact that the small permanent magnets will continue to apply a magnetic flux towards the operational side even when the electromagnets are turned off. Since in this case the electromagnets will not enact any magnetic field, the magnetic field of the small permanent magnets will not be nullified and will therefore continue to act towards the operational side.

In some embodiments of the present disclosure, a double circumferential magnetic array is introduced, which is the equivalent of having two circumferential magnetic arrays back-to-back (see for example the implementations illustrated in FIGS. 16 to 21) By sharing the electromagnets between the two sides of the double magnetic array, a space-saving design is achieved while maintaining the same desirable functionality.

In some embodiments of the present disclosure, a linear magnetic array is introduced (see for example the implementations illustrated in FIGS. 25 to 30). While the same functionality as the circumferential magnetic array is maintained, a linear magnetic array design may be preferable in certain use cases.

In some embodiments of the present disclosure, a double linear magnetic array is introduced, which is the equivalent of having two linear magnetic arrays back-to-back (see for example the implementations illustrated in FIGS. 33 to 35 and FIGS. 36 to 38). By sharing the electromagnets between the two sides of the double magnetic array, a space-saving design is achieved while maintaining the same desirable functionality.

FIGS. 1 to 7 depict a first example implementation of a hybrid permanent magnet-electromagnetic circumferential array A1 and FIGS. 13 to 15 depict a second example implementation of a hybrid permanent magnet-electromagnetic circumferential array A2. In the implementations of FIGS. 1 to 7 and FIGS. 13 to 15, a circular stator 3 houses the magnetic array A1, A2, respectively. Circular stator 3 can be affixed to a solid structure via bolt holes 20 provided through a central portion of the stator assembly. The magnetic array A1 and magnetic array A2 are each comprised of both permanent magnets 2A and electromagnets 1A in a repeating pattern. The electromagnets 1A consist of a ferromagnetic core wrapped in an electromagnetic coil 5. The electromagnets 1A can be easily identified in FIGS. 5 and 13 due to their protruding nature, which is exaggerated in the example embodiments in order to provide the reader with a clearer understanding. In some embodiments of the present disclosure, as exemplified by FIGS. 1, 5, 6, and 7, the magnetic array A1 consists of three permanent magnets 2A for every electromagnet 1A (i.e., three permanent magnets 2A are located or interspaced between each pair of electromagnets 1A about the circumference of the magnetic array A1).

In some embodiments of the present disclosure, as exemplified by FIGS. 13, 14, and 15, in magnetic array A2 the ratio of permanent magnets 2A to electromagnets 1A is such that there is one electromagnet 1A for every permanent magnet 2A (i.e., permanent magnets 2A and electromagnets 1A alternate with each other about the circumference of the magnetic array A2). The additional electromagnets 1A in magnetic array A2 are intended to provide better system disengagement when an 'OFF' state is desired, as they enable a complete Halbach array weak side to implemented on the operational side of the array A2. While requiring extra power to operate, the improved disengagement enabled by the additional electromagnets 1A is expected to prove an overall beneficial addition to the system in at least some applications. In some embodiments of the present disclosure, there are sixteen individual magnets which combine to form the entire magnetic array A1, A2, although this can be altered to any number of individual constituents.

Rubber lining 4 can be included to ensure that the magnets experience a snug fit within a circumferential magnet housing that is defined by stator 3. In some embodiments of the present disclosure, the stator 3 has several holes 7 machined about its circumference adjacent its outer diameter. The holes 7 act to lower the overall weight of the magnetic array A1, A2, while ensuring that the structural integrity of the array remains uncompromised.

In some embodiments of the present disclosure, the permanent magnets 2A comprise high-strength neodymium iron boron (NdFeB) permanent arc magnets. However, other magnetic materials and shapes, including cubes, rectangular prisms, cylinder, and discs, are viable as well. In some embodiments of the present disclosure, the permanent magnets 2A may be coated in a layer of insulative material to protect the magnets from scratching, heat, and impact loads.

Figure 2:
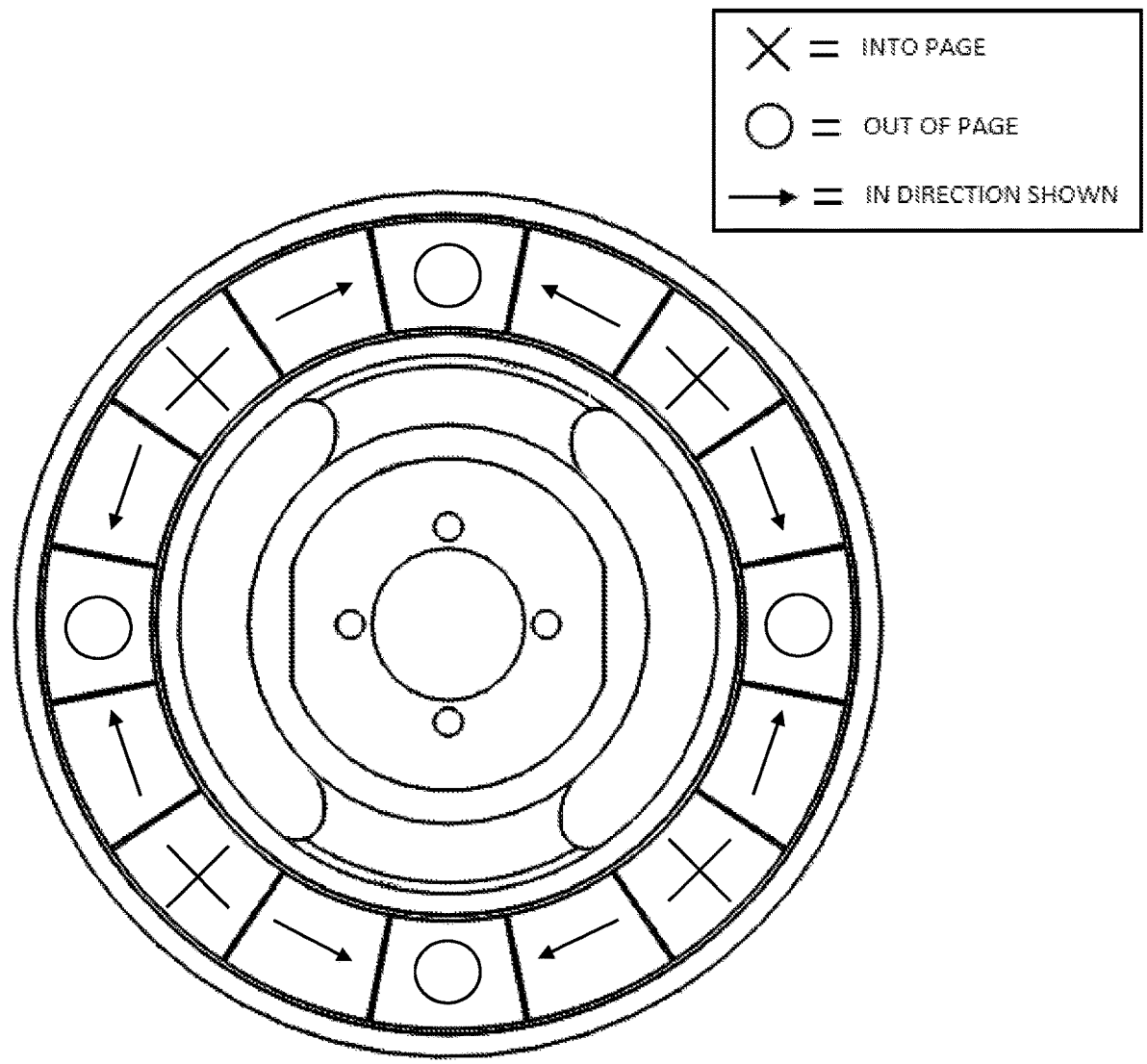
FIG. 2 depicts a front view of the circumferential magnetic array of FIG. 1 showing the magnetic orientations of the individual magnets forming a Halbach array, representing an 'ON' state.
Figure 3:
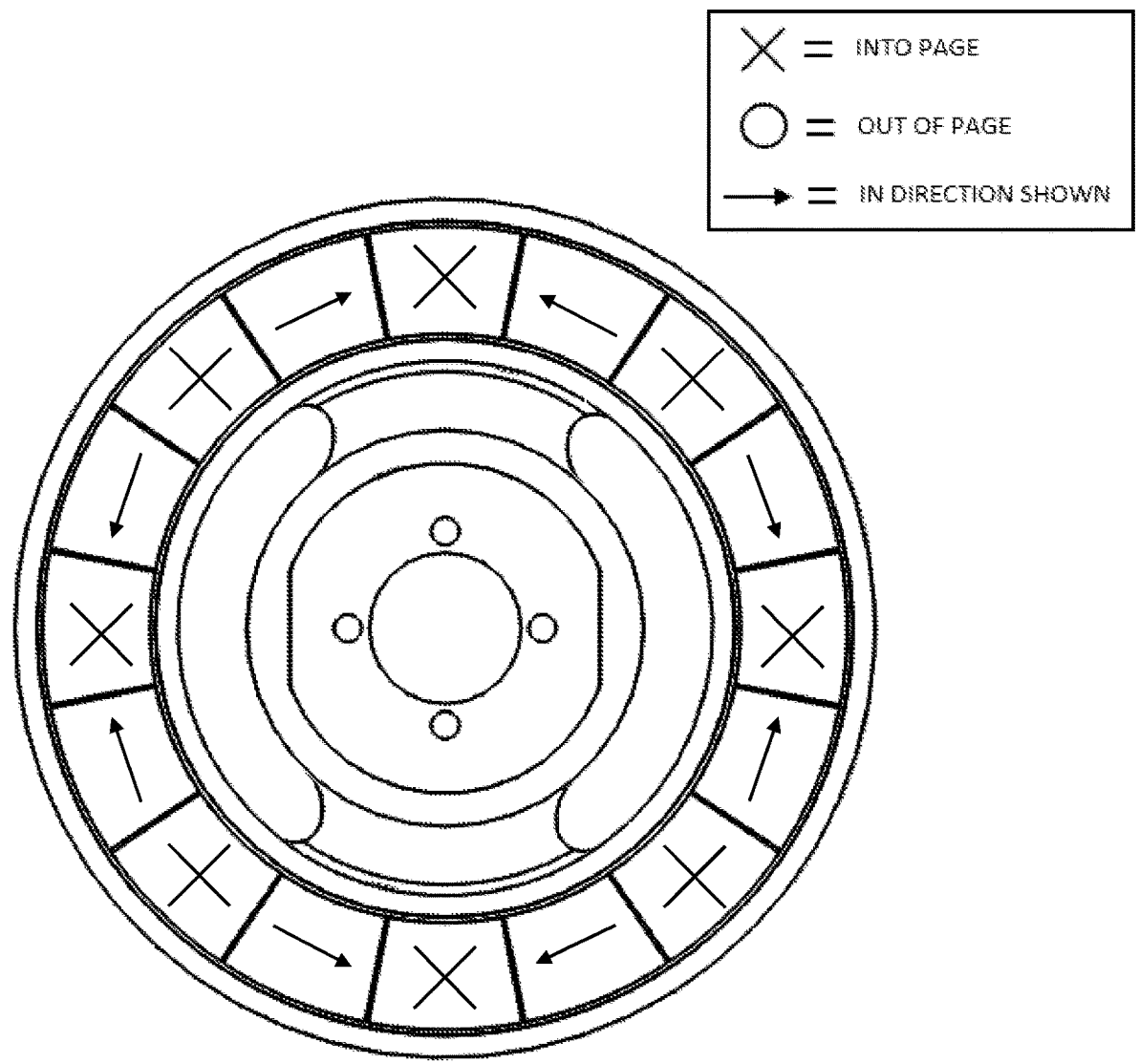
FIG. 3 depicts a front view of the circumferential magnetic array of FIG. 1 showing the magnetic orientations of the individual, representing an 'OFF' state.

The key difference between a regular magnetic array and a Halbach array lies with the fact that the magnetic orientation of neighboring magnets in a Halbach array is out of phase by 90 degrees relative to one another. FIGS. 2 and 3 provide a visualization of the orientation of individual magnets within the circumferential magnetic array A1. The special pattern shown has the ability to generate an augmented magnetic field which is substantially stronger and substantially perpendicular to the face of the magnets than what is achievable with a regular magnetic array. The particular magnetic orientation shown in FIG. 2 would result in a completed Halbach array with its strong side (i.e., the working face of the array) being directed out of the page, and therefore the Halbach array weak side (i.e., non-working face) would be going into the page. Similarly, with the simple change of the polarity of the electromagnets 1A in the magnetic array A1, the magnetic orientation shown in FIG. 3 would result in the working face of the array being directed into the page, and therefore the non-working face would be going out of the page. It will be noted however, that in the case of FIG. 3, the pattern of magnetic orientations does not form a completed Halbach array as only the orientation of 4 of the 16 magnets in the array have been reversed.

The polarity of the electromagnets 1A of magnetic array A1 or A2 can be controlled by a controller 100 (see FIG. 1). Controller 100 includes one or more switches or relays that can be controlled to selectively activate the electromagnets 1A by connecting the electromagnetic coils of electromagnets 1A to a power source with either a first current polarity to effect an 'ON' state of the magnetic array A1 or A2 or a second (i.e., reverse) current polarity to effect an 'OFF' state of the magnetic array A1 or A2.

Figure 8:
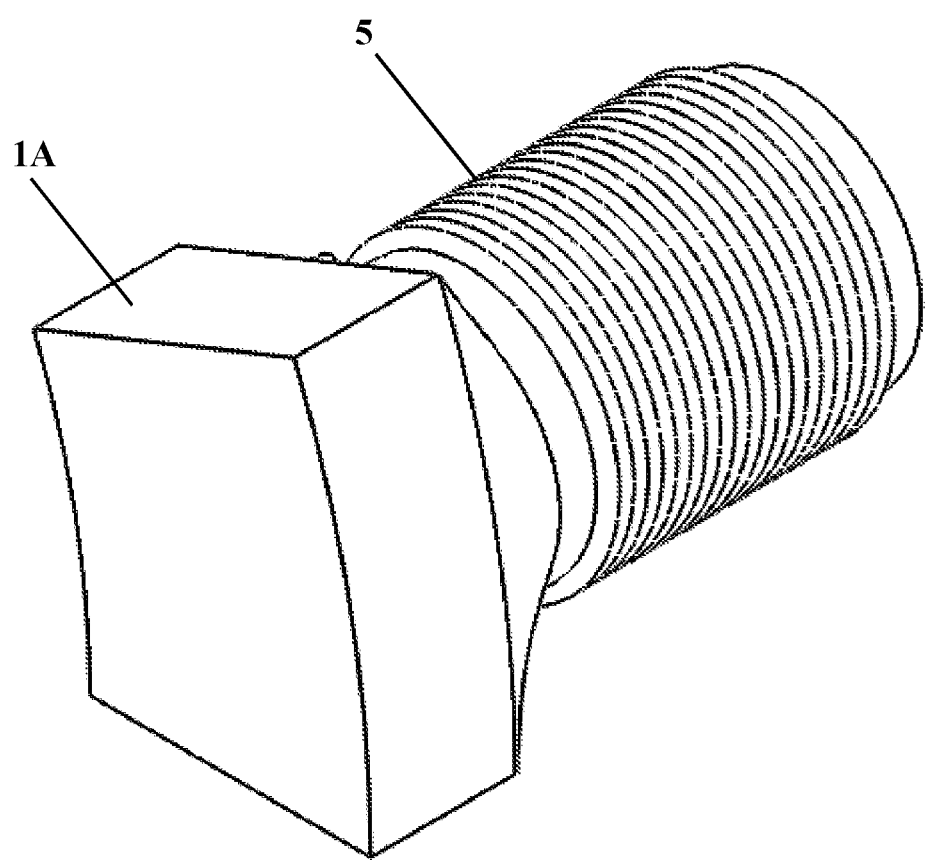
FIG. 8 depicts an isometric view of an individual electromagnet of the circumferential magnetic array of FIG. 1, according to an example implementation.
Figure 9:
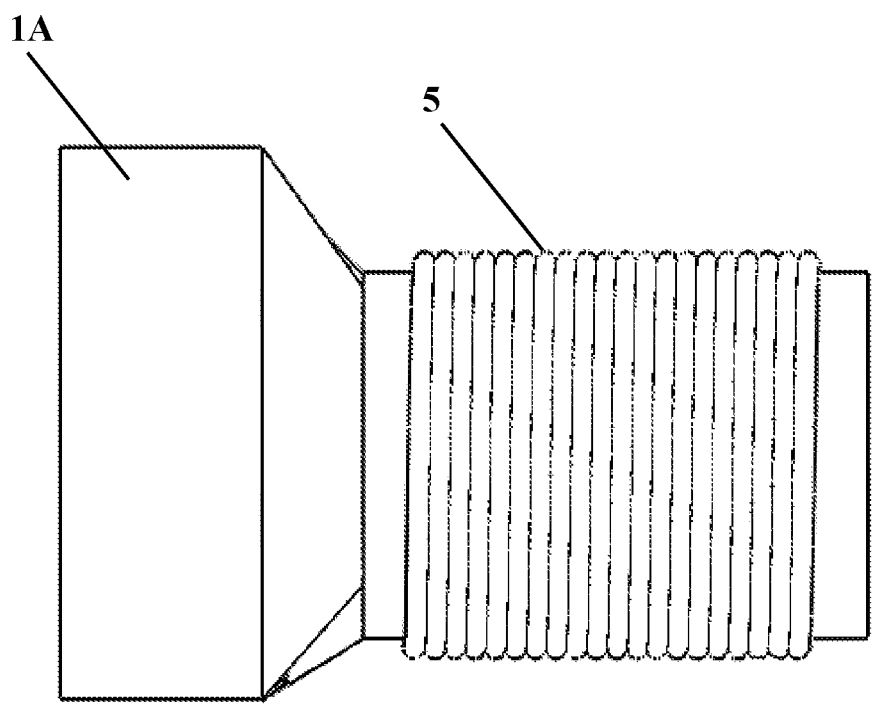
FIG. 9 depicts a side view of the individual electromagnet of FIG. 8.

If the operational side is imagined to be in front of the magnetic array A1, in order to achieve an 'ON' state (i.e., in order to configure the operational side to implement a Halbach array strong side), the magnetic orientation must resemble the orientations illustrated in FIG. 2. On the other hand, in order to achieve an 'OFF' state (in which the operational side does not implement a strong side of a Halbach array), the magnetic orientation can resemble FIG. 3. For obvious reasons it is impossible to reverse the physical direction of the stator itself such that the magnetic orientation of the electromagnets which were originally directed towards the operational side is now facing away from it. However, in some embodiments of the present disclosure, it is possible to control (via controller 100) the electromagnet array's orientation by reversing the flow of electric current through the electromagnetic coils 5 shown in FIGS. 8, 9, and 10. If the flow of electric current in one direction results in the magnetic orientation shown in FIG. 2, by reversing the flow of electric current such that it now flows in the opposite direction, the magnetic orientation of the electromagnets 1A may be reversed resulting in the orientation shown in FIG. 3. The reversal of the energizing current results in effectively switching the operational side of the magnetic array A1 from a Halbach array strong side (i.e., working face) to a face with a much weaker magnetic flux. In the example of magnetic array A1 only the magnetic flux coming out of the page from the four electromagnets 1A switches direction when comparing FIG. 3 to FIG. 2. The reversal of magnetic orientation of four of the 16 magnets is sufficient to stop the Halbach array strong side on the operational side of the magnetic array, and have partial cancelling effect on the magnetic field on the resulting array configuration on the operational side.

In order to enable switching of the operational side of the array from a Halbach array strong side in the 'ON' state to a Halbach array weak side in the 'OFF' state, an equal ratio of alternating electromagnets 1A and permanent magnets 2A can be used, such as in magnetic array A2. In the case of magnetic array A2 in which permanent magnets 2A and electromagnets 1A alternate about the stator 3, both sets of magnetic orientations (e.g. those going into and coming out of the page) would be able to switch, such that the system disengagement (i.e., shift of the operational side from a working face to a non-working face) would be better in the magnetic array A2 configuration as compared to that of the magnetic array A1 configuration that includes a lower ratio of electromagnets 1A to permanent magnets 2A.

With the above-described functionality, some embodiments of the present disclosure allow for control of whether to engage or disengage the system based on the direction of electric current flowing through the electromagnets 1A. Additionally, the strength of the magnetic field generated can be altered by varying the amount of electric current supplied to the electromagnets 1A. This may allow for precise adjustment of the magnetic field strength and the magnetic flux through the operational side.

Figure 4:
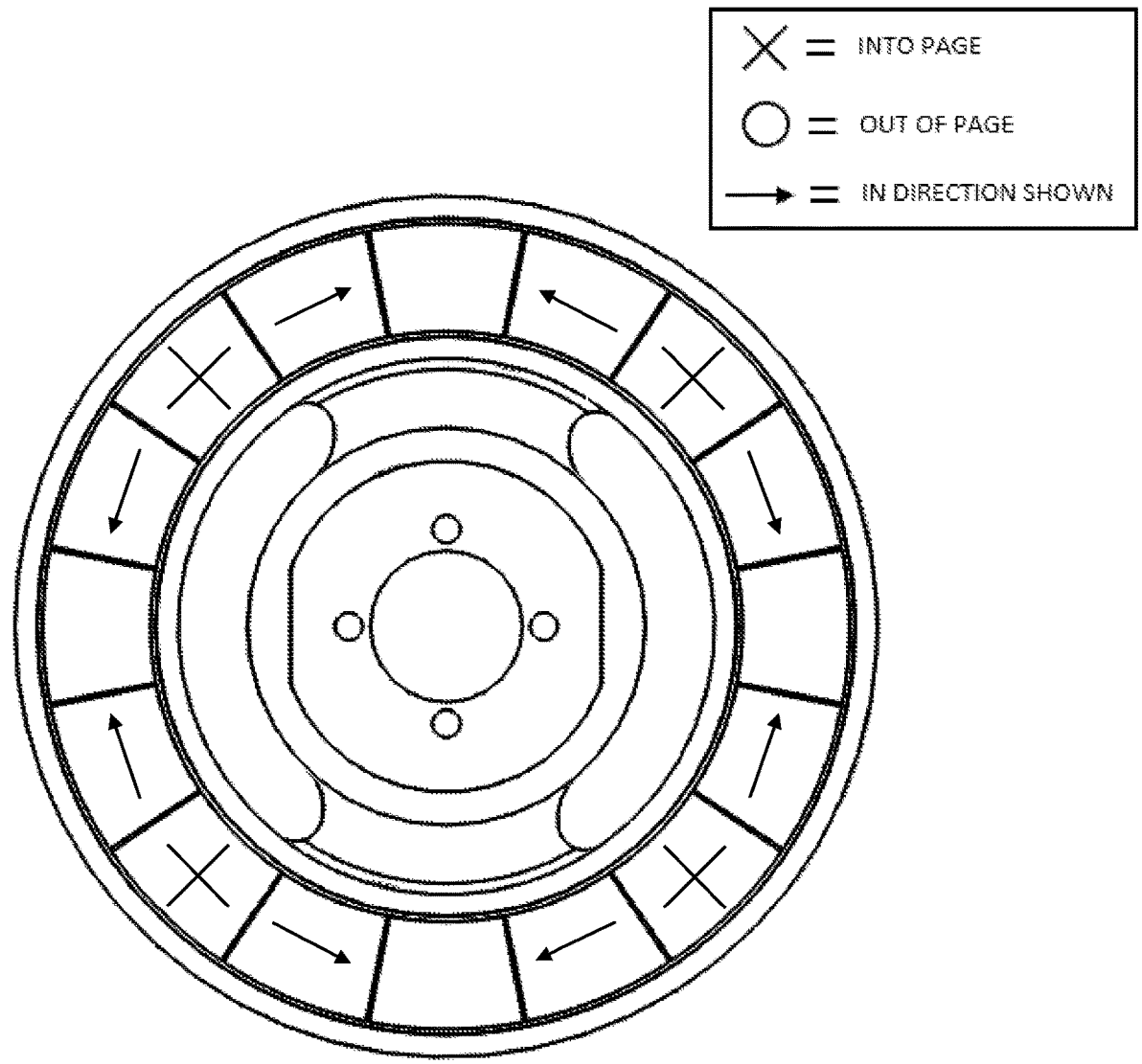
FIG. 4 depicts a front view of the circumferential magnetic array of FIG. 1 showing the magnetic orientations of the individual magnets, representing a 'NEUTRAL' state where the electromagnets are turned off and only a residual magnetic flux is generated by the permanent magnets.
Figure 5:
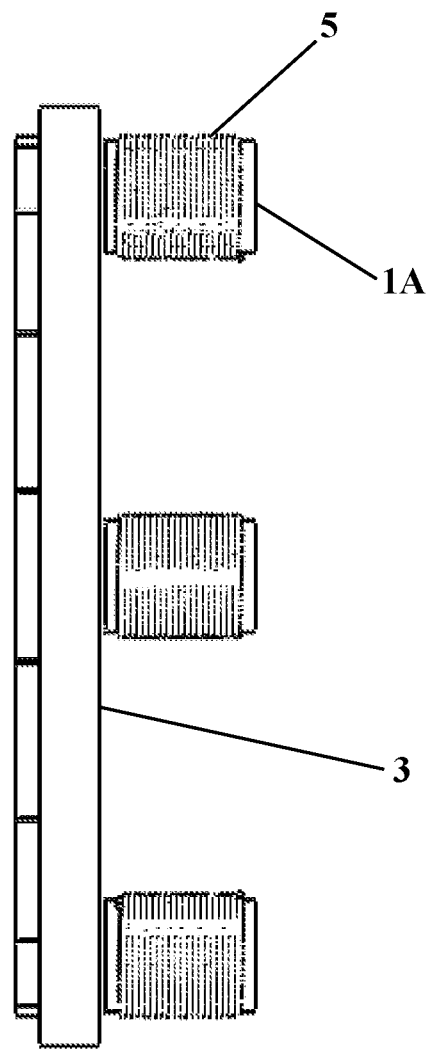
FIG. 5 depicts a side view of the circumferential magnetic array of FIG. 1, showing three of the four electromagnets affixed to the stator.

Some embodiments of the present disclosure include a fail-safe mechanism which is naturally integrated when considering a Halbach array. In the case of an electrical failure, the electric current supplied to the electromagnets 1A would be cut off resulting in the electromagnets 1A no longer functioning. However, the permanent magnets 2A which form a certain percentage of the magnets in the magnetic array A1, A2 would still function regardless of the electromagnets 1A, as is the nature of permanent magnets. This is referred to as the 'NEUTRAL' state of the array and is shown in FIG. 4 in the case of magnetic array A1. If the electromagnets 1A were malfunctioning such that only the permanent magnets 2A would contribute to the magnetic field experienced, the magnetic flux would be generated in a direction substantially parallel to the face of the magnets. This would still result in a residual magnetic field being generated and would therefore present itself as a built-in safety feature that would automatically occur in the event of an electrical failure.

Figure 11:
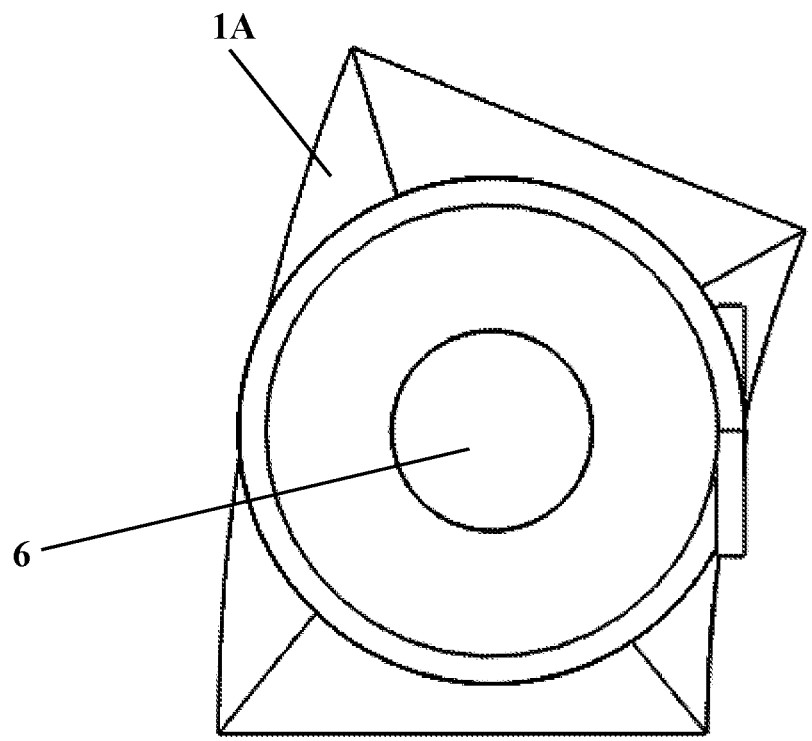
FIG. 11 depicts a back view of an individual electromagnet of FIG. 8, showing the small permanent magnet embedded into the ferromagnetic core of the electromagnet
Figure 12:
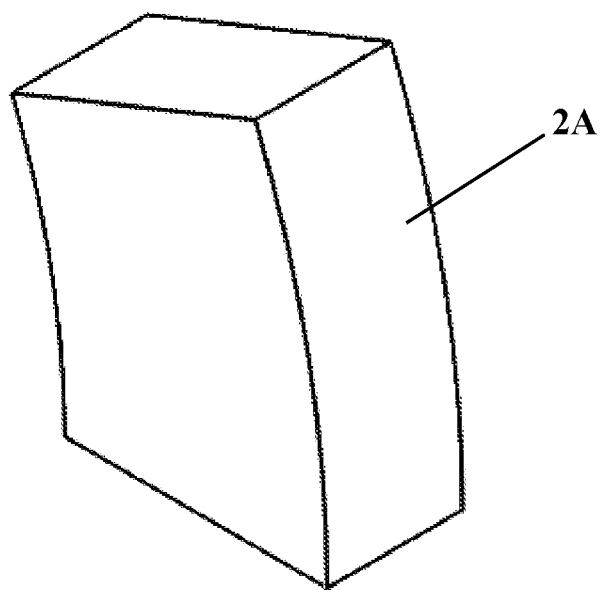
FIG. 12 depicts an isometric view of an individual permanent magnet of the circumferential magnetic array of FIG. 1, according to an example implementation.

Now, referring to FIG. 12, the arc shape of the permanent magnets 2A in some embodiments of the present disclosure can be seen in greater detail. The given shape of the permanent magnets 2A results in a specific pole projection area being generated. In order to ensure that the optimal performance of the magnetic array A1, A2 is achieved, the pole projection area of the permanent magnets 2A and electromagnets 1A should be identical within acceptable manufacturing tolerances. As such, in some embodiments of the present disclosure, as can be seen in detail in FIGS. 8 and 11, the electromagnet 1A is fitted with a custom head shape so that the pole projection area is the same between the permanent magnets 2A and electromagnets 1A.

Figure 6:
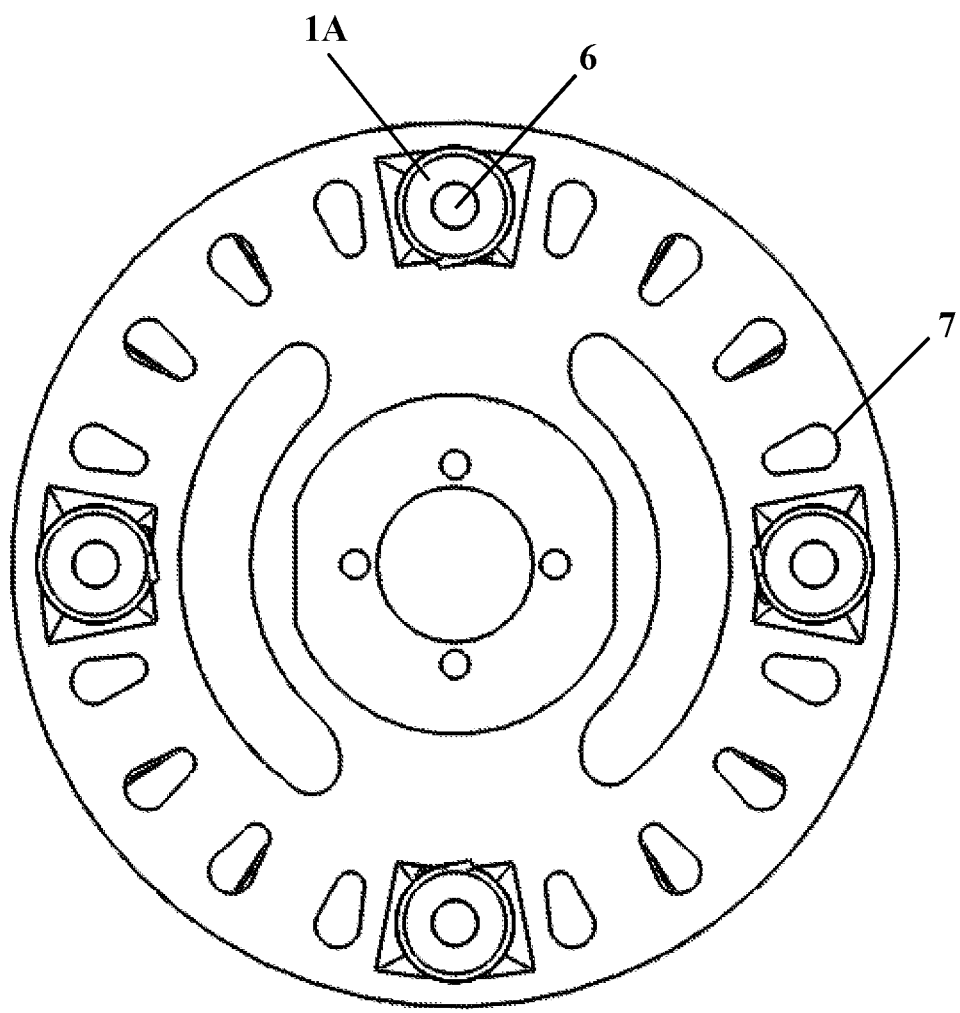
FIG. 6 depicts a back view of the circumferential magnetic array of FIG. 1, illustrating small permanent magnets housed in holes formed in the ferromagnetic cores of the respective electromagnets.
Figure 7:
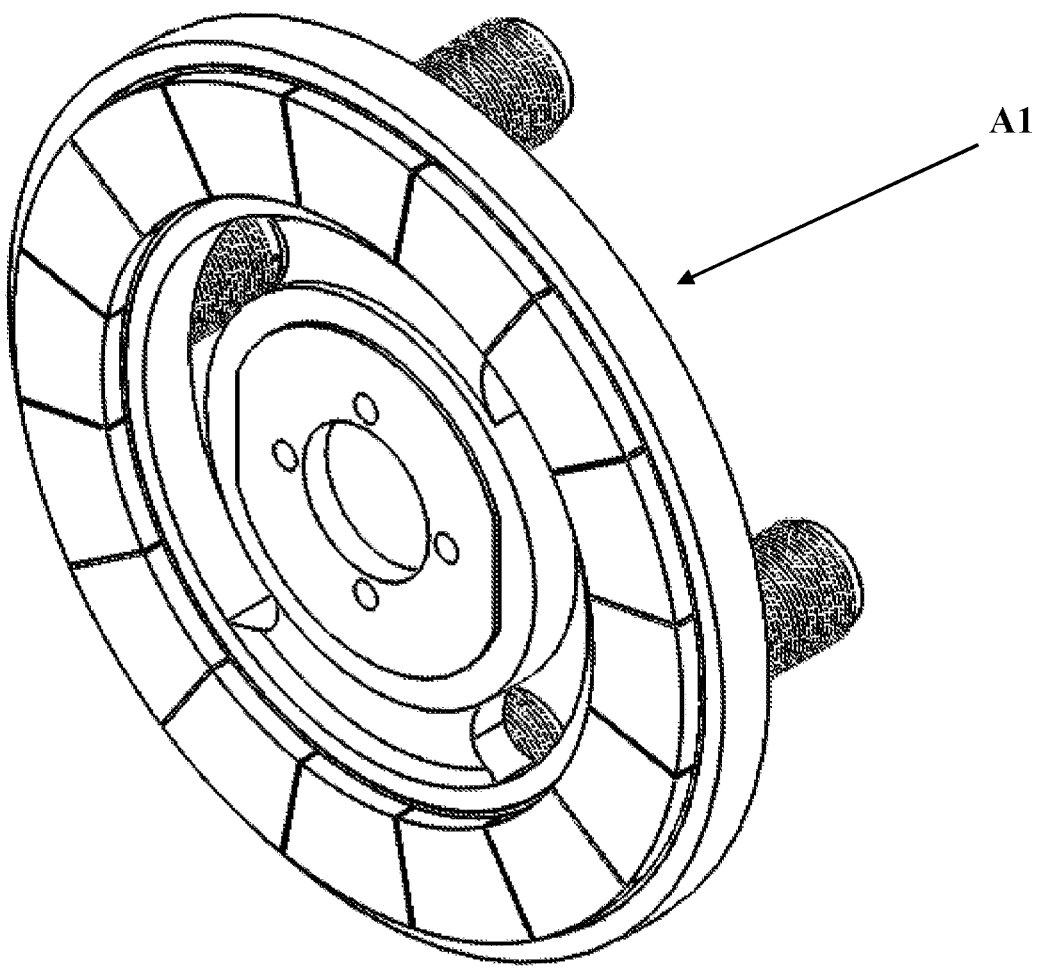
FIG. 7 depicts an isometric view of the circumferential magnetic array of FIG. 1.
Figure 10:
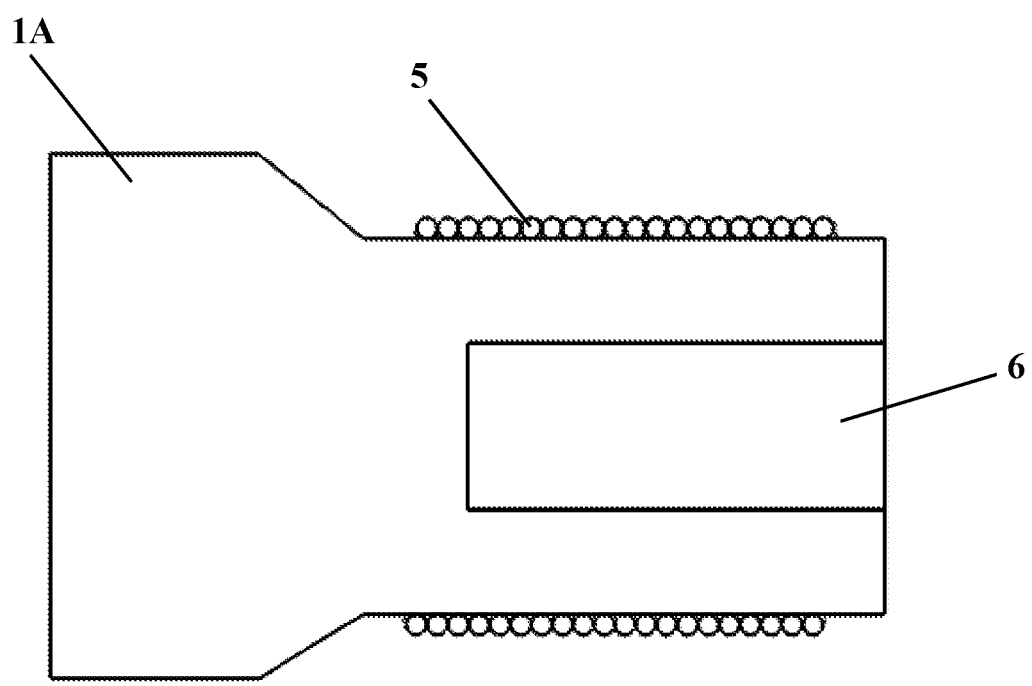
FIG. 10 depicts a sectional side view of the individual electromagnet of FIG. 8, showing the small permanent magnet embedded into the ferromagnetic core of the electromagnet.

In some embodiments of the present disclosure, the electromagnets 2A are fitted with additional, small permanent magnets 6 inserted into machined holes in their ferromagnetic cores, as shown in FIG. 6 and in more detail in FIGS. 10 and 11. The benefits of this addition are two-fold. Firstly, when the system is in its 'ON' state, the small permanent magnets 6 are oriented in such a way that they will complement the magnetic field generated by the magnetic array A1, A2 and will therefore provide additional magnetic flux towards the operational side. This, however, also remains true for when the system is desired to be disengaged, meaning that the small permanent magnets 6 will continue to apply a magnetic flux in the direction of the operational side which would normally result in a limited 'ON' state. However, due to the relative strength of the magnetic field of the electromagnet 1A compared to the strength of the magnetic field of the small permanent magnets 6, the electromagnetic field, when active, will dominate and neutralize the effect of the small permanent magnets 6. That being said, the addition of the small permanent magnets 6 may also work to enhance the previously mentioned fail-safe nature of the magnetic array A1, A2, where the small permanent magnets 6 will continue to provide a residual magnetic field even when the electromagnets 1A are not functioning. This benefit is only possible in this scenario because the electromagnets 1A will not have any electric current being supplied to their electromagnetic coils 5, and will therefore not generate a magnetic field, thus the small permanent magnets 6 will have a field which is still present and is directed through the operational side.

Figure 16:
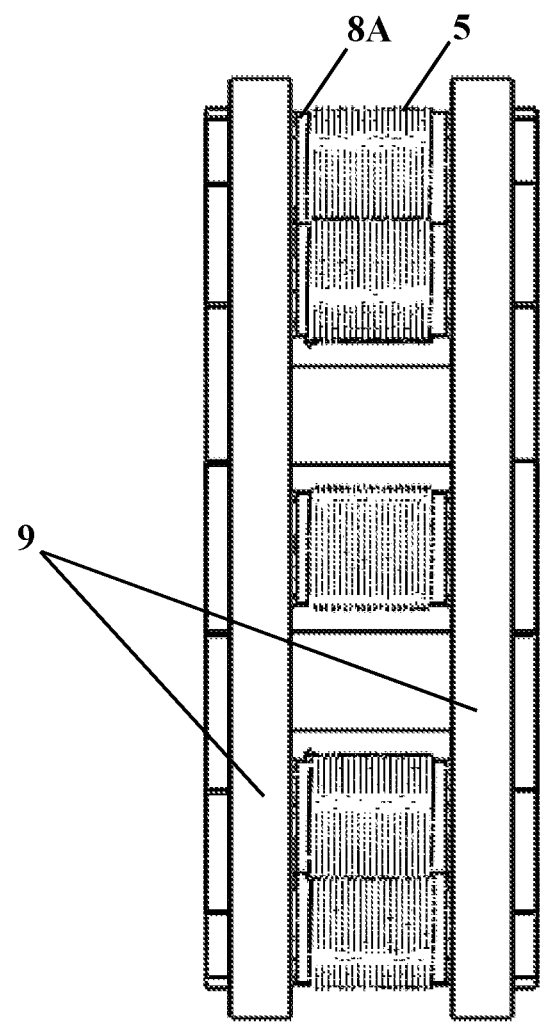
FIG. 16 depicts a side view of a double circumferential magnetic array comprised of both permanent magnets and eight double-sided electromagnets affixed to a double-sided stator, according to a further example implementation of the present disclosure. The double circumferential magnetic array is functionally equivalent to having two circumferential magnetic arrays back-to-back.
Figure 17:
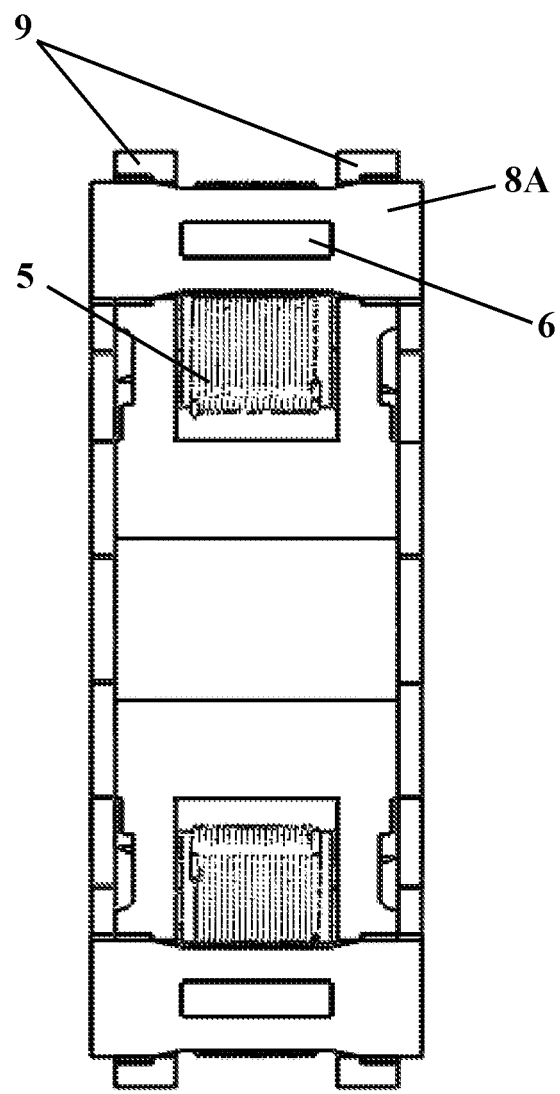
FIG. 17 depicts a sectional side view of the double circumferential magnetic array of FIG. 16, illustrating small permanent magnets housed embedded in the ferromagnetic cores of the respective electromagnets.
Figure 22:
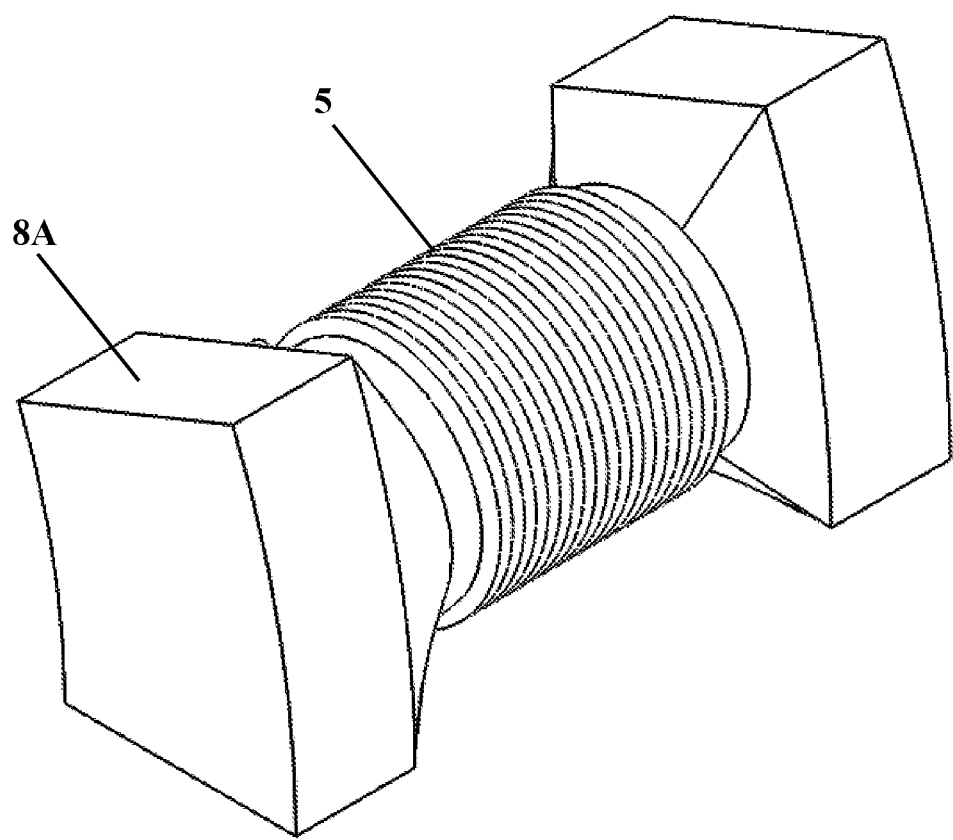
FIG. 22 depicts an isometric view of an individual double-sided electromagnet of the double circumferential magnetic array of FIG. 16, according to an example implementation.
Figure 23:
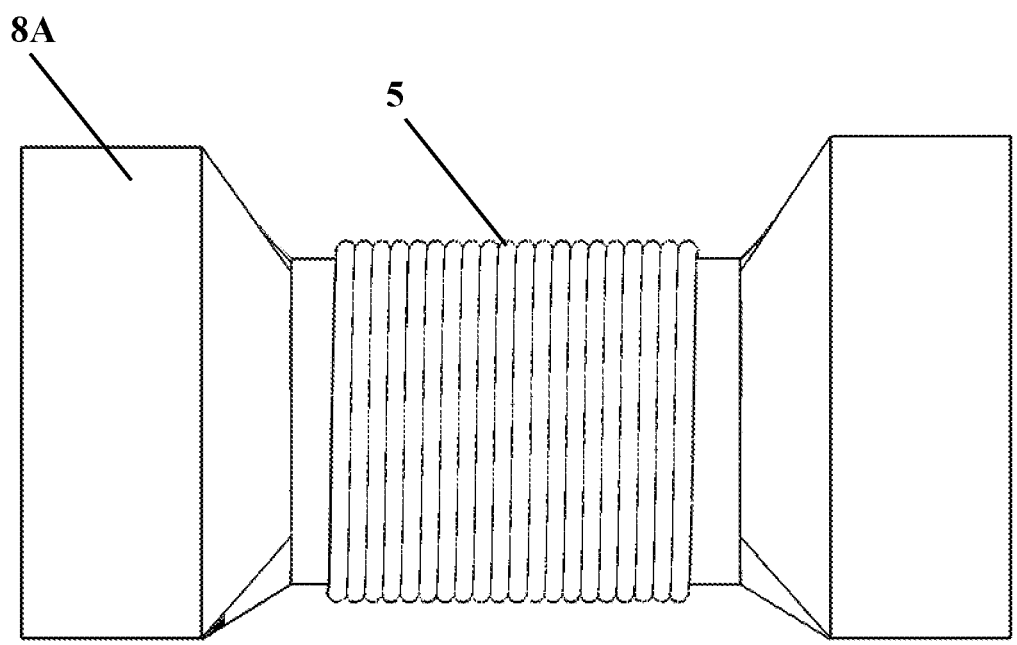
FIG. 23 depicts a side view of the individual double-sided electromagnet of FIG. 22.

Referring to FIG. 16, in some embodiments of the present disclosure, two stators 3 may be combined into one, such that they form a double-sided stator 9, with each side being an operational side. This is equivalent to having two magnetic arrays A2 back-to-back. However, in the illustrated example the double-sided stator 9 is not formed by holding together two individual stators 3 with a central piece, but rather the double-sided stator 9 is manufactured as a single piece. In this way the double-sided stator 9 allows for a double magnetic array A3, with the space saving benefit of having shared double-sided electromagnets 8A which can be seen in FIG. 16 or in greater detail in FIGS. 22 and 23. The double-sided electromagnets 8A can allow for a tighter fit between opposing sides of the double-sided stator, enabling lower profile. Each side of the double magnetic array A3 will have its own set of permanent magnets 2A. The design of the double magnetic array A3 is possible due to the nature of the magnetic orientations required to form a Halbach array as described in respect of FIG. 2. Referring to FIG. 16, and imagining that a respective operational side were to sit on both sides of the double magnetic array A3, one could see that in order to obtain a reinforced magnetic flux going through each of the two operational sides (as would be desired for the 'ON' state), one could configure the left side of the double magnetic array A3 to be magnetically oriented in the same manner as shown in FIG. 2 and configure the right side of the double magnetic array A3 to be magnetically oriented in the exact opposite manner to that shown in FIG. 2 (i.e. with the polarity of all the magnets in the array being flipped 180°). In this way the augmented magnetic flux from the left-hand side will be directed through the left-hand operational side and the augmented magnetic flux from the right-hand side will be directed through the right-hand operational side. As can be seen, the required magnetic orientation for one electromagnet is opposite to that of the electromagnet in the mirrored position in the second half of the double magnetic array A3. As such, the ability to simply use a double-sided electromagnet 8A is enabled.

Figure 24:
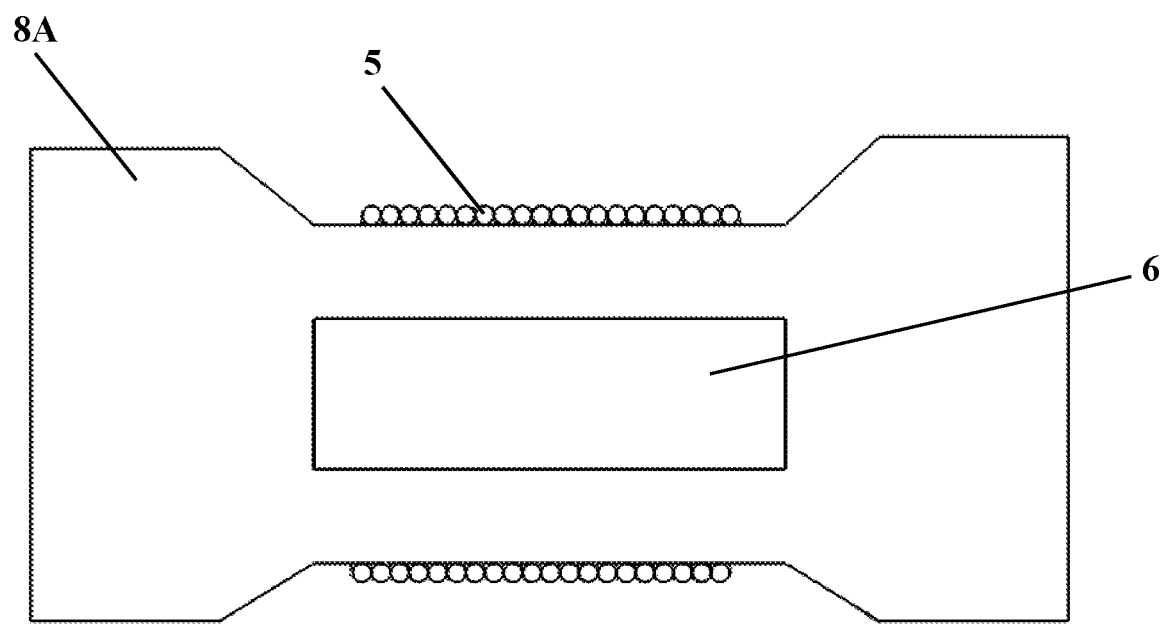
FIG. 24 depicts a sectional side view of the individual double-sided electromagnet of FIG. 22, wherein the small permanent magnet embedded into the ferromagnetic core is visible.

In some embodiments of the present disclosure, the double-sided electromagnets 8A comprising the double magnetic array A3, may have small permanent magnets 6 embedded into their ferromagnetic cores. This can be seen in FIG. 17 or in greater detail in FIG. 24. As previously described, this has the benefit of increasing both the magnetic flux towards an operational side during the 'ON' state and increasing the residual magnetic field present in the case where the double-sided electromagnets 8A are turned off.

Figure 18:
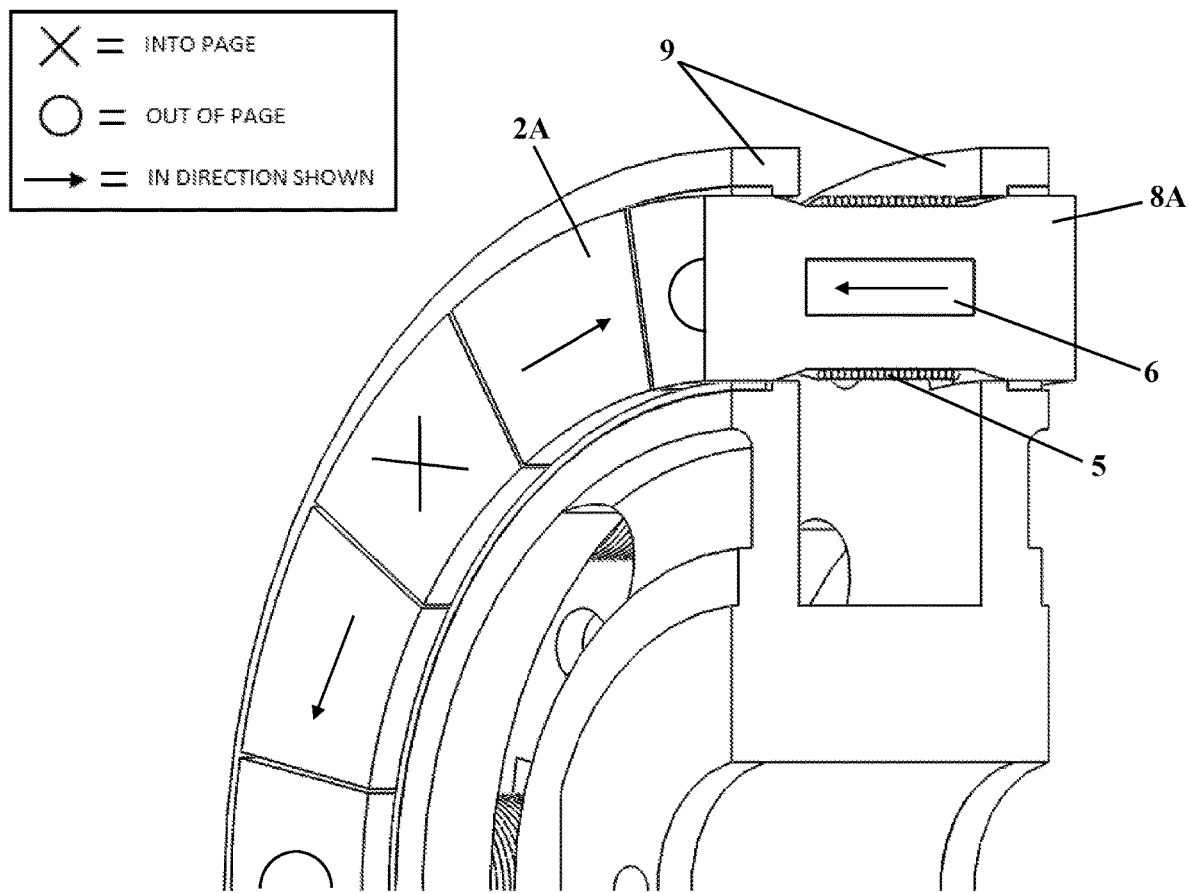
FIG. 18 depicts an isometric sectional view of a portion of the double circumferential magnetic array of FIG. 16, showing the magnetic orientations of the individual magnets, representing an 'ON' state.

Referring to FIG. 18, the illustration shown is representative of the 'ON' state for the double magnetic array A3. However, the key information conveyed by this figure is the direction of the magnetic flux from the small permanent magnet 6. As can be seen, for the 'ON' state of the double magnetic array A3, the small permanent magnet 6 is oriented such that it acts in the same direction as the double-sided electromagnet 8A itself. In this way, the small permanent magnet 6 will complement the overall magnetic flux generated.

Figure 19:
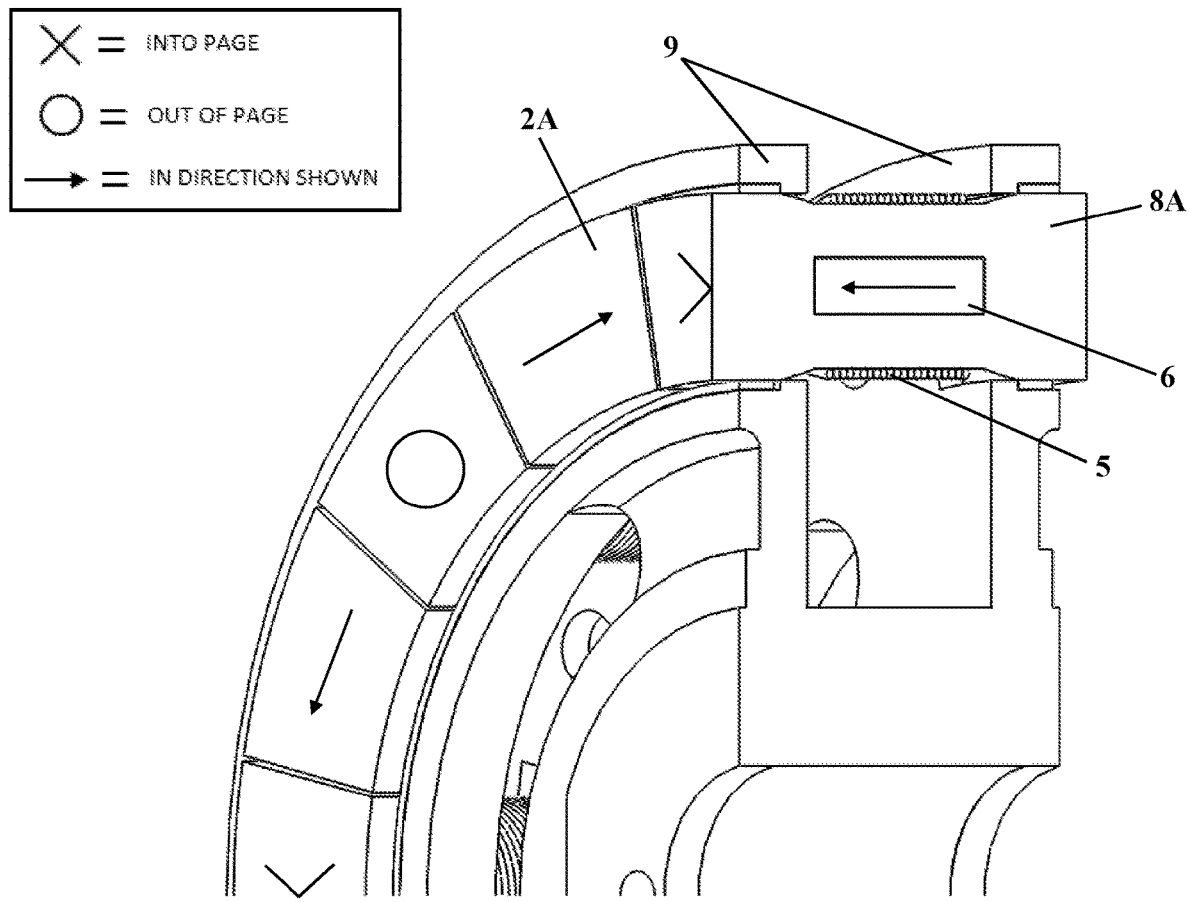
FIG. 19 depicts an isometric sectional view of a portion of the double circumferential magnetic array of FIG. 16, showing the magnetic orientations of the individual magnets, representing an 'OFF' state.

Referring to FIG. 19, the illustration shown is representative of the 'OFF' state for the double magnetic array A3. The small permanent magnet 6 embedded in the ferromagnetic core cannot have its magnetic orientation changed, therefore even during the 'OFF' state it will continue to emanate a magnetic flux towards the operational sides, which would normally be representative of the 'ON' state. However, due to the relatively weak strength of the magnetic field created by the small permanent magnet 6 compared to the double-sided electromagnet 8A, the magnetic flux from the small permanent magnet 6 will be nullified by the magnetic flux from the double-sided electromagnet 8A and will therefore not have a magnetic flux acting towards the operational side.

Figure 20:
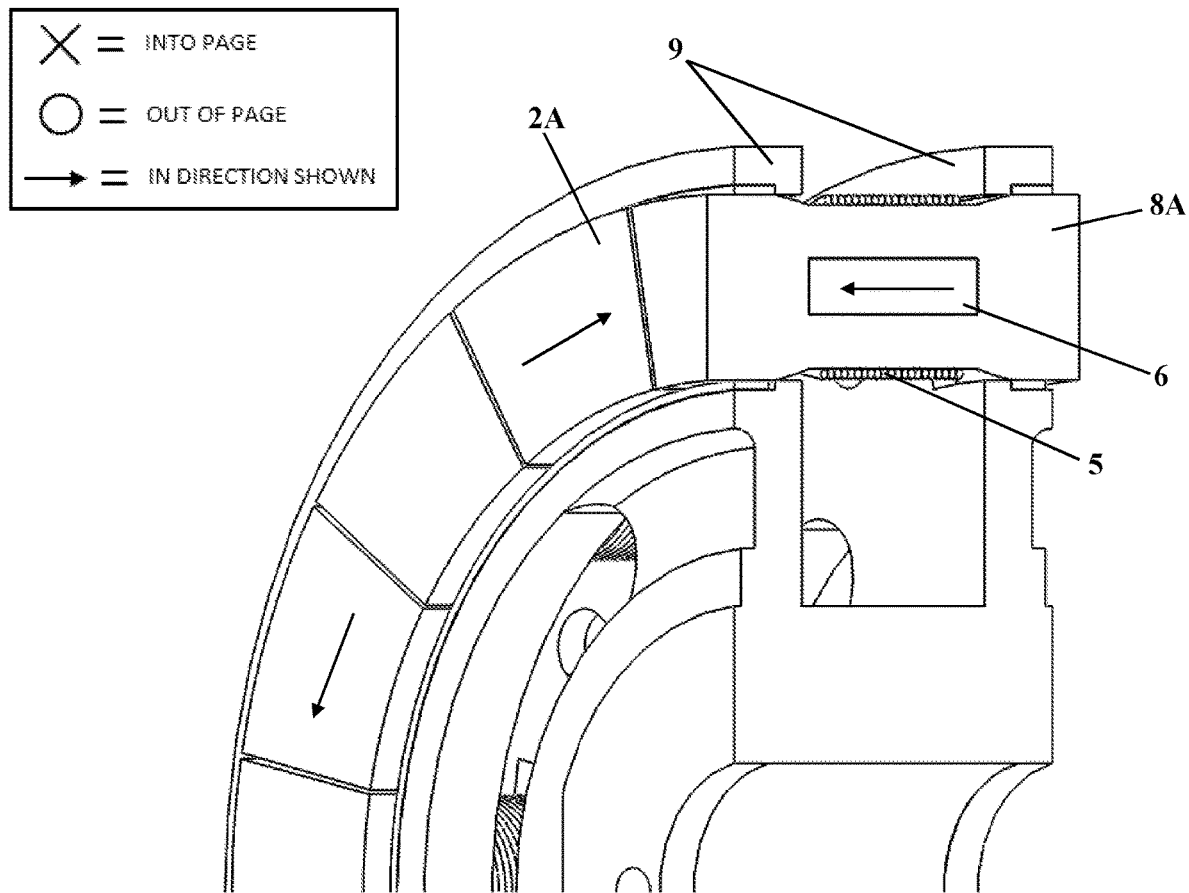
FIG. 20 depicts an isometric sectional view of a portion of the double circumferential magnetic array of FIG. 16, the magnetic orientations of the individual magnets, representing a 'NEUTRAL' state where the electromagnets are turned off and only a residual magnetic flux is generated by the permanent magnets.
Figure 21:
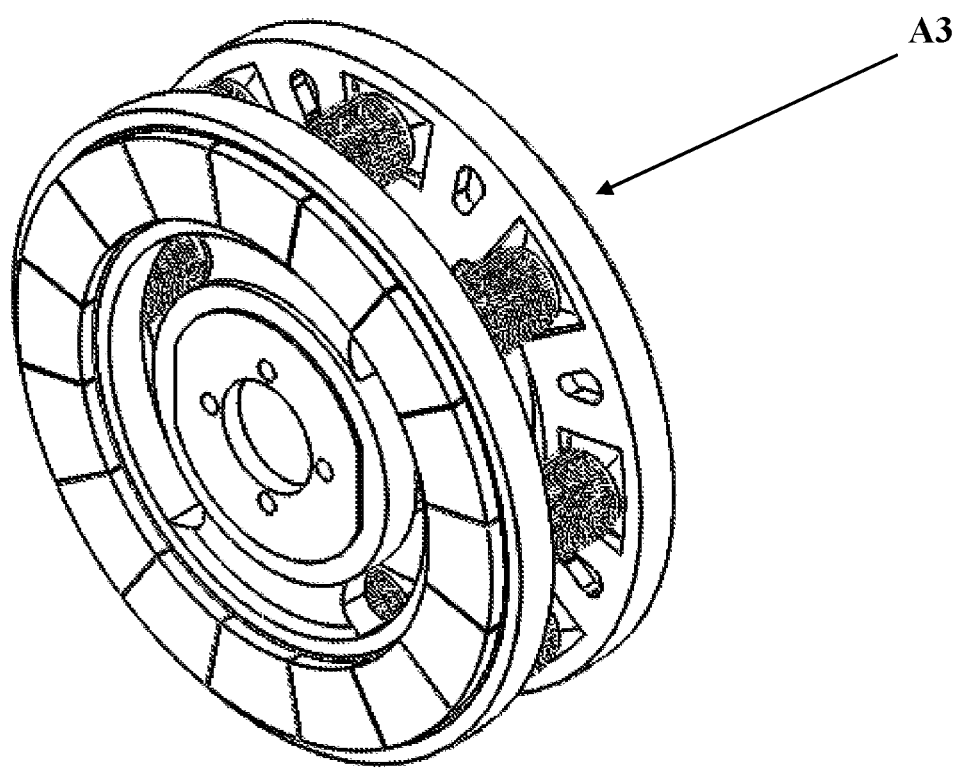
FIG. 21 depicts an isometric view of the double circumferential magnetic array of FIG. 16.

Referring to FIG. 20, the illustration shown is representative of the 'NEUTRAL' state where the double-sided electromagnets 8A are turned off and it highlights the fail-safe nature of this system. The double-sided electromagnets 8A would likely only be off in the case of an electrical failure where electric current can no longer be supplied to the electromagnetic coils 5. In such a scenario, the permanent magnets 2A, including the small permanent magnets 6 embedded in the ferromagnetic cores, would continue to enact a magnetic field in the direction they are oriented to do so. This means that the small permanent magnets 6 would generate a magnetic flux which would still act towards the operational side and would therefore result in an increased residual magnetic flux compared to if they were not present.

In some embodiments of the present disclosure, the small permanent magnets 6 enclosed within the double-sided electromagnets 8A of the double magnetic array A3, are oriented in an altering pattern within adjacent double-sided electromagnets 8A. If the small permanent magnet 6 of the first double-sided electromagnet 8A was oriented as shown in FIG. 18, the double-sided electromagnets 8A on either side of the first double-sided electromagnet 8A would have their small permanent magnets 6 oriented to provide a magnetic flux in the opposite direction. In this way, the benefits of having the small permanent magnets 6 would be experienced by both operational sides of the double magnetic array A3.

FIGS. 25, 26, 27, 28, 29, and 30 depict a hybrid permanent magnet-electromagnetic linear array. The linear arrangement of magnets may prove beneficial in certain applications. The linear magnetic array A4 operates under the same principles as the circumferential magnetic array A1, A2. The stator 10 can be affixed to a solid structure via the bolt holes provided at ends of the stator. An alternating pattern of permanent magnets 2B and electromagnets 1B is utilized in order to form a linear Halbach array. In some embodiments of the present disclosure, the linear magnetic array A4 comprises three permanent magnets 2B for every electromagnet 1B. In some embodiments of the present disclosure, the linear magnetic array A4 comprises one permanent magnet 2B for every electromagnet 1B. As previously mentioned, the increased ratio of electromagnets 1B to permanent magnets 2B provides better system disengagement. FIGS. 25, 26, 27, 28, 29, and 30 show four permanent magnets 2B and four electromagnets 1B in the magnetic array A4, however this limit is mainly set for ease of viewing and can easily be extended to any number of individual magnets.

Figure 29:
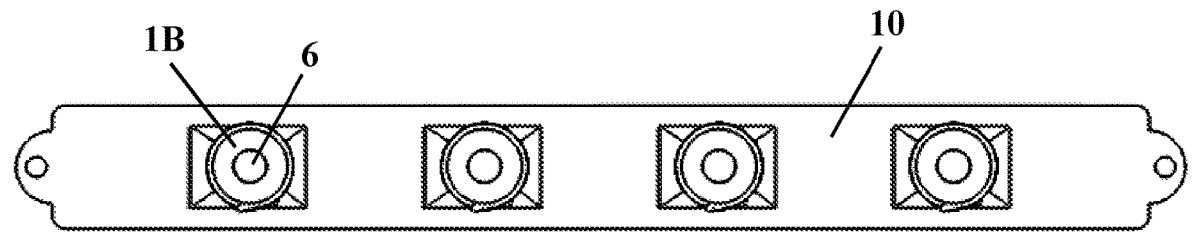
FIG. 29 depicts a back view of the linear magnetic array of FIG. 25, showing holes machined into ferromagnetic cores of the four electromagnets which house small permanent magnets.
Figure 30:
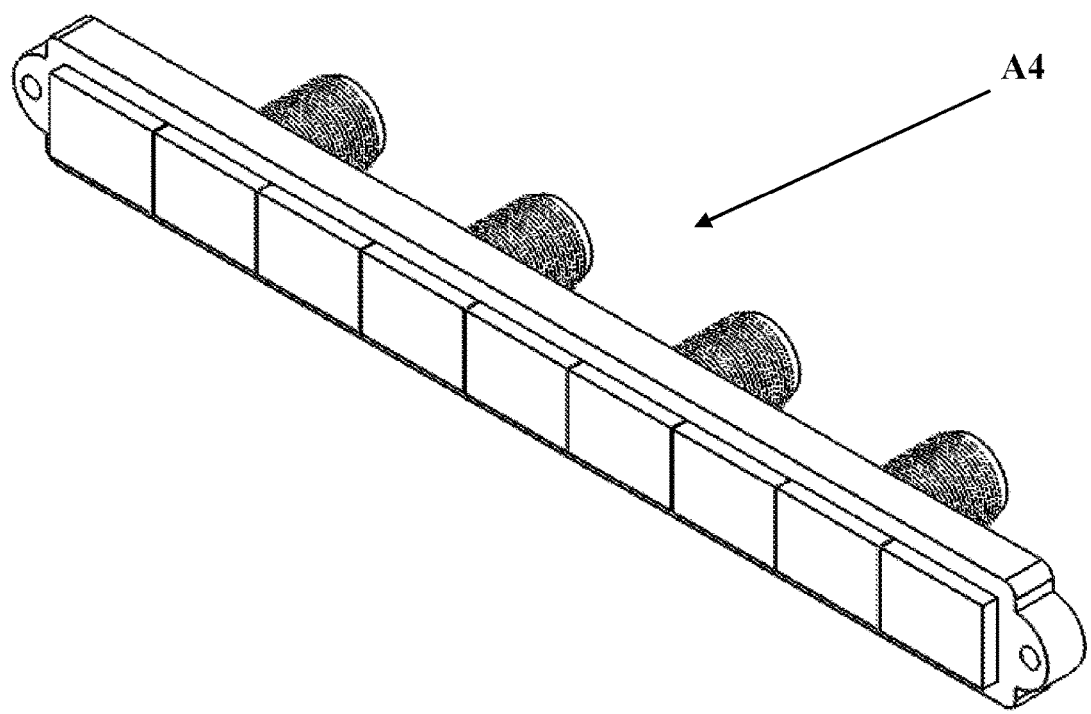
FIG. 30 depicts an isometric view of the linear magnetic array of FIG. 25.

Referring to FIG. 29, in some embodiments of the present disclosure, the electromagnets 1B comprising the linear magnetic array A4, may have small permanent magnets 6 embedded into their ferromagnetic cores. As described previously, this has the benefit of increasing both the magnetic flux towards the operational side during the 'ON' state and increasing the residual magnetic field present in the case where the electromagnets are turned off.

Figure 25:
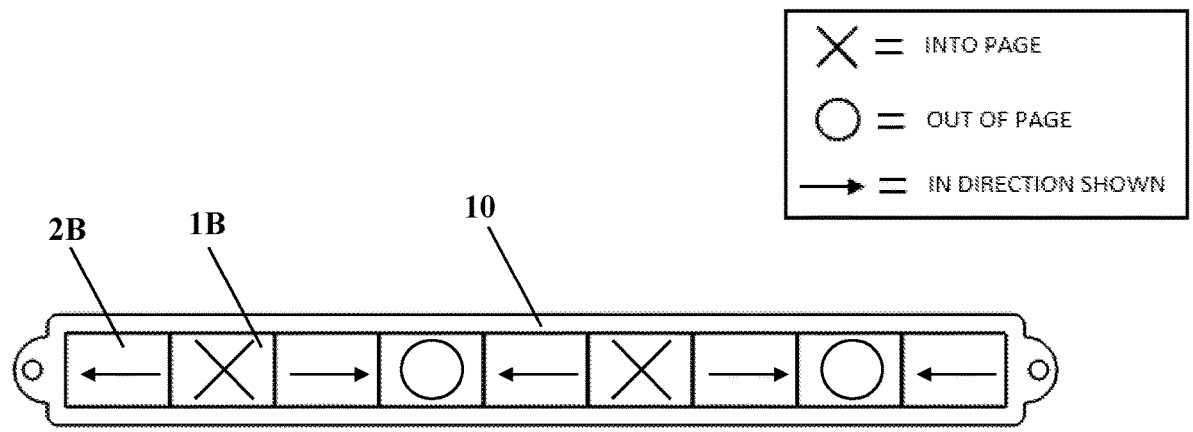
FIG. 25 depicts a front view of a linear magnetic array comprised of both permanent magnets and electromagnets affixed to a stator, according to a further example implementation of the disclosure, along with the magnetic orientations of the individual magnets required to form a Halbach array, representative of an 'ON' state.

Referring to FIG. 25, the illustration shown is representative of the 'ON' state for the linear magnetic array A4. The arrangement of magnets is such that the augmented magnetic flux will be generated so that it is coming out of the page and will be directed towards the operational side. The small permanent magnets 6 embedded in the ferromagnetic cores of the electromagnets 1B will be oriented such that their polarity aligns with that of the electromagnets 1B when the electromagnets 1B are configured such that the 'ON' state of the linear magnetic array A4 is experienced. In this way, the small permanent magnets 6 will act in the same direction as the electromagnets 1B thus producing an even stronger resultant 'ON' state.

Figure 26:
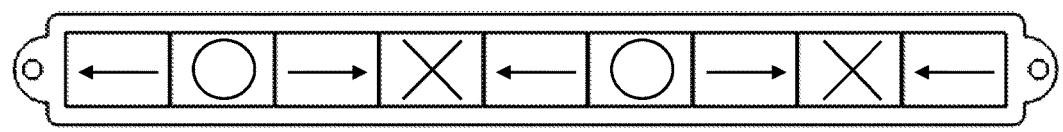
FIG. 26 depicts a front view of the linear magnetic array of FIG. 25 with the magnetic orientations of the individual magnets representing an 'OFF' state.

Referring to FIG. 26, the illustration shown is representative of the 'OFF' state for the linear magnetic array A4. The arrangement of magnets is such that the augmented magnetic flux is going into the page and will be directed away from the operational side of the linear magnetic array A4. Of course, the small permanent magnets 6 embedded in the ferromagnetic cores of the electromagnets 1B cannot have their magnetic orientation changed, therefore even during the 'OFF' state they will continue to emanate a magnetic flux towards the operational side. However, due to the relatively weak strength of the magnetic field created by the small permanent magnets 6 compared to the electromagnets 1B, the magnetic flux from the small permanent magnets 6 will be nullified by the magnetic flux from the electromagnets 1B and will therefore not provide any substantial magnetic flux towards the operational side.

Figure 27:
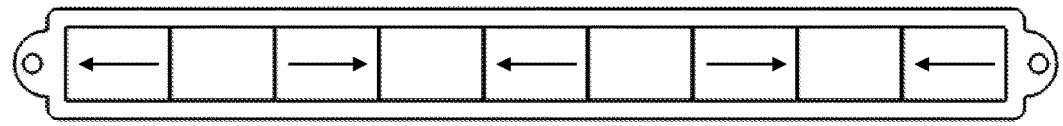
FIG. 27 depicts a front view of the linear magnetic array of FIG. 25, representative of the 'NEUTRAL' state where the electromagnets are turned off and only a residual magnetic flux is generated by the permanent magnets.
Figure 28:
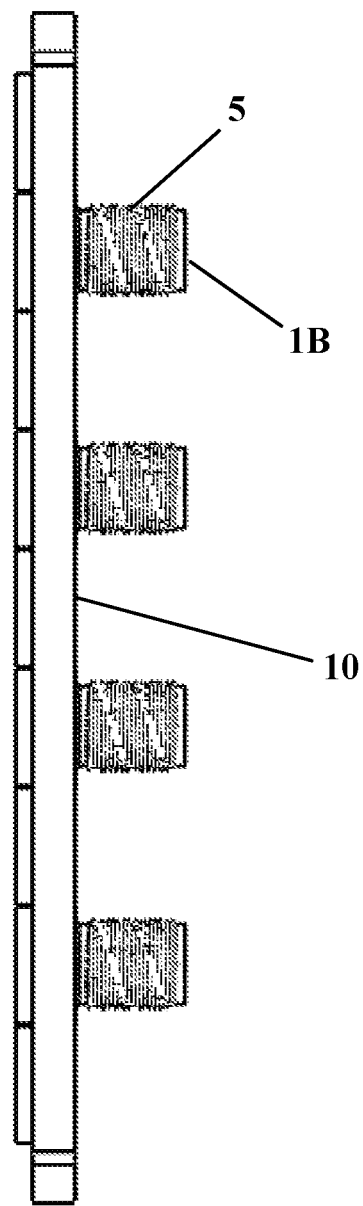
FIG. 28 depicts a side view of the linear magnetic array of FIG. 25 comprised of both permanent magnets and four electromagnets affixed to the stator.

Referring to FIG. 27, the illustration shown is representative of the 'NEUTRAL' state where the electromagnets 1B are turned off and it highlights the fail-safe nature of this system. The electromagnets 1B would likely only be off in the case of an electrical failure where electric current can no longer be supplied to the electromagnetic coils 5. In such a scenario, the permanent magnets 2B, including the small permanent magnets 6 embedded in the ferromagnetic cores, would continue to enact a magnetic field in the direction they are oriented to do so. This means that the small permanent magnets 6 would generate a magnetic flux which would still act through the operational side and would therefore result in a desirable (for some applications) effect of having a residual magnetic field still acting towards the operational side.

Figure 31:
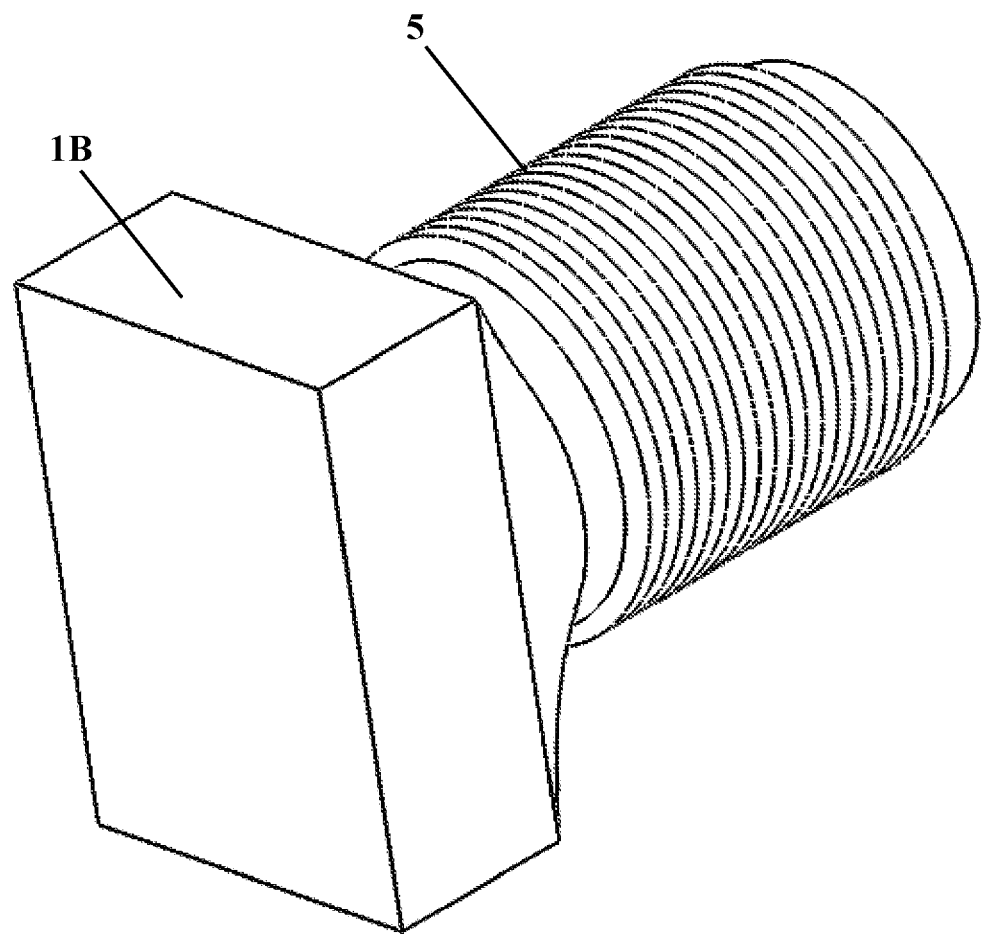
FIG. 31 depicts an isometric view of an individual electromagnet of the linear magnetic array of FIG. 25.
Figure 32:
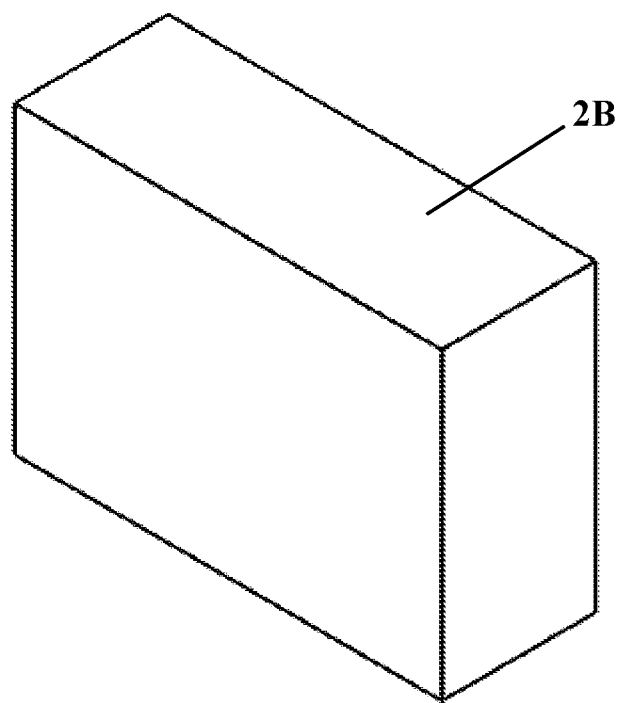
FIG. 32 depicts an isometric view of an individual permanent magnet of the linear magnetic array of FIG. 25.

Referring to FIG. 32, it will be noted that the pole projection area for the permanent magnets 2B used for the linear magnetic array A4 is different than the pole projection area for the permanent magnets 2A used for the circumferential magnetic array A1, A2. As such, the electromagnets 1B used for the linear magnetic array A4 have an adjusted pole projection array relative to the electromagnets 1A used for the circumferential magnetic array A1, A2. As seen in FIG. 31 in some embodiments of the present disclosure, a custom-shaped rectangular head is added to the ferromagnetic cores as opposed to the arc-shaped head used previously.

Figure 33:
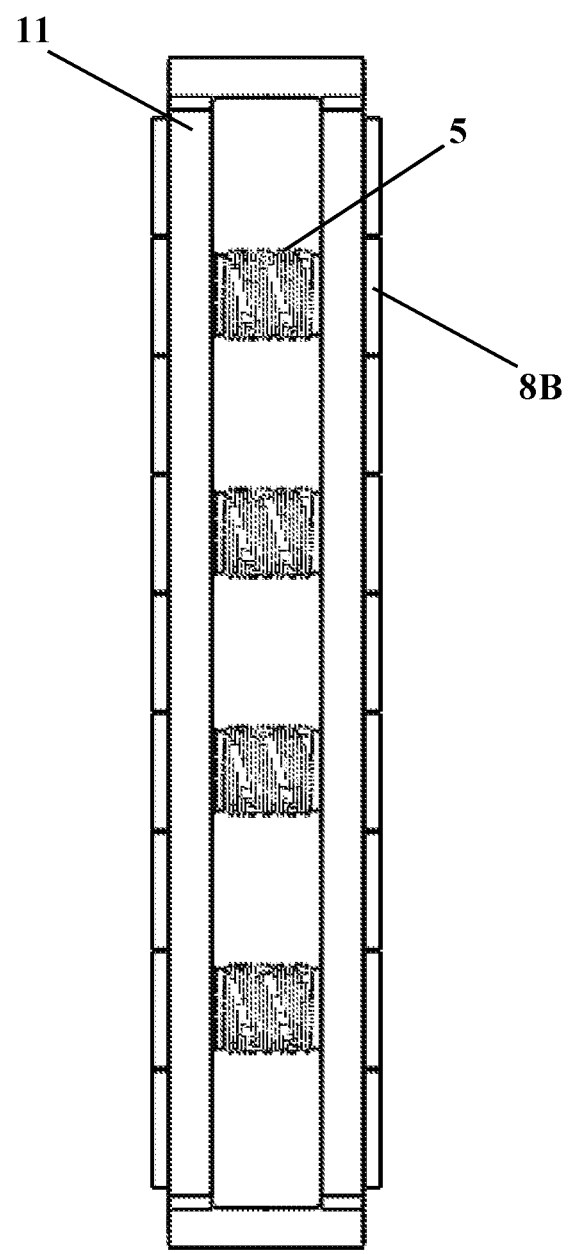
FIG. 33 depicts a side view of a double linear magnetic array comprised of both permanent magnets and four electromagnets affixed to a double-sided stator, according to a further example implementation of the disclosure.
Figure 34:
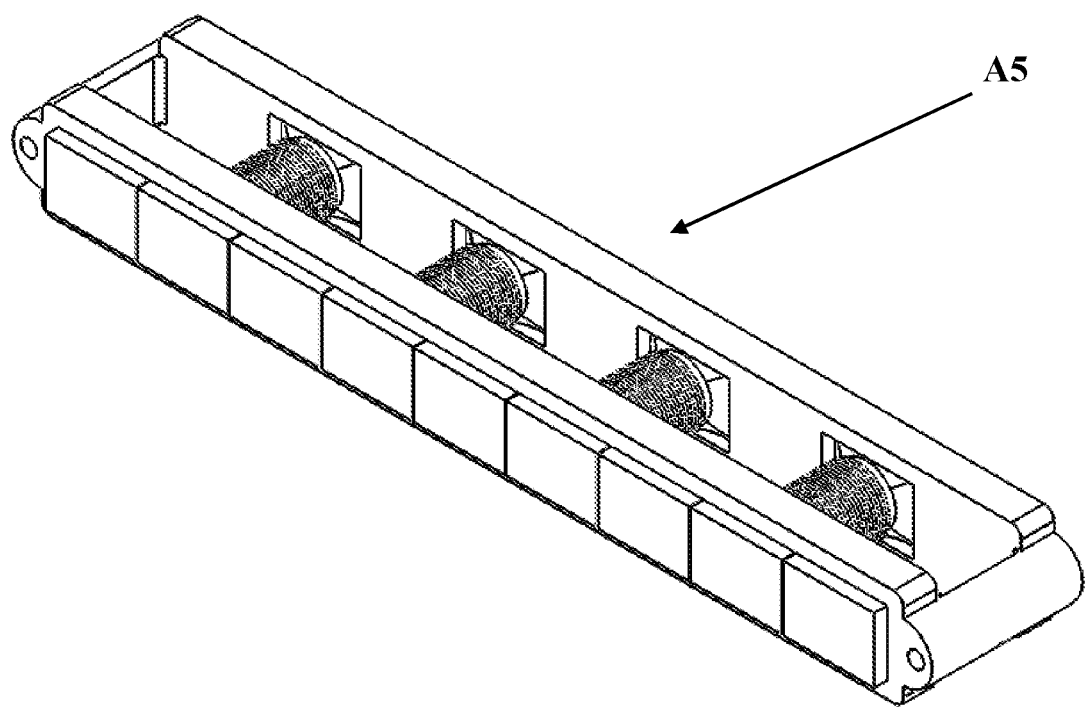
FIG. 34 depicts an isometric view of the double linear magnetic array comprised of FIG. 33.

Referring to FIG. 33, in some embodiments of the present disclosure, two stators 10 may be combined into one, such that they form a double-sided stator 11. This is equivalent to having two linear magnetic arrays A4 back-to-back. In at least some example implementations, the double-sided stator 11 is not formed by holding together two individual stators 10 with a central piece, but rather the double-sided stator 11 is manufactured as a single piece. In this way the double-sided stator 11 allows for a double linear magnetic array A5, with the space saving benefit of having shared double-sided electromagnets 8B which can be seen in FIG. 34. The double-sided electromagnets 8B, allow for a tighter fit between the two stators while also allowing for eight double-sided electromagnets 8B to be used instead of four, which once again will serve to improve system disengagement. Each side of the double linear magnetic array A5 will have its own permanent magnets 2B. The design of the double magnetic array A5 is only possible due to the nature of the magnetic orientations required to form a Halbach array as described in FIGS. 25 and 26. Referring to FIG. 33, and imagining that the operational side were to sit on both sides of the double linear magnetic array A5, one could see that in order to obtain a reinforced magnetic flux going through each of the two operational sides (as would be desired for the 'ON' state), one could simply configure the left side of the double linear magnetic array A5 to be arranged in the same manner as shown in FIG. 25 and the right side of the double linear magnetic array A5 to be arranged in the same manner as shown in FIG. 26 except with the permanent magnets 2B having their direction reversed. In this way the augmented magnetic flux from the left-hand side will be directed through the left-hand operational side and the augmented magnetic flux from the right-hand side will be directed through the right-hand operational side. As can be seen, the required magnetic orientation for one electromagnet is opposite to that of the electromagnet in the mirrored position in the second half of the double linear magnetic array A5. As such, the ability to simply use a double-sided electromagnet 8B is enabled.

Figure 35:
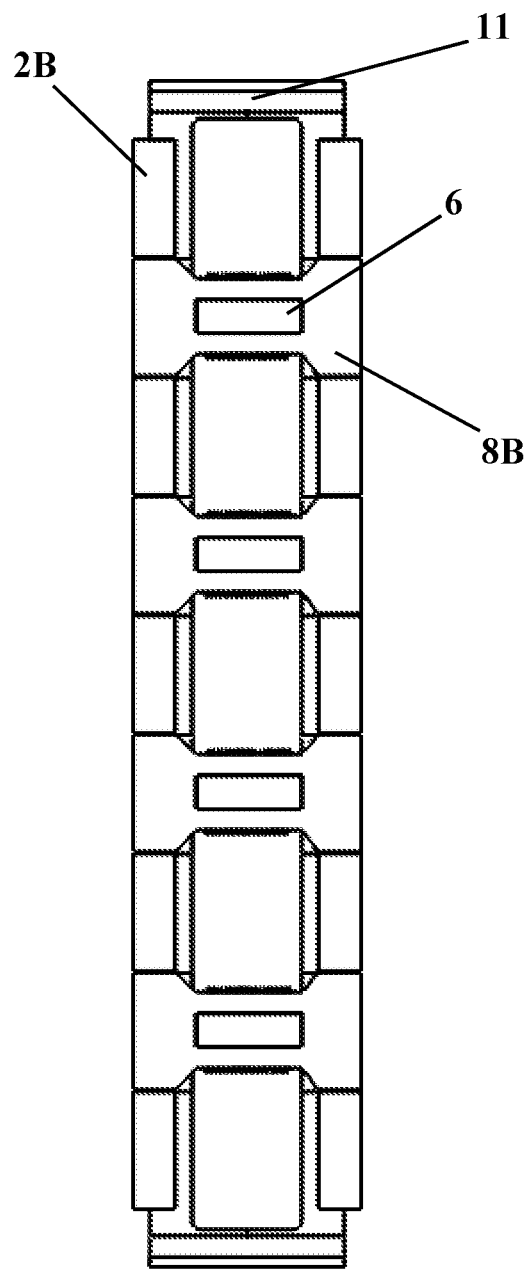
FIG. 35 depicts a sectional side view of the double linear magnetic array of FIG. 33.

Referring to FIG. 35, in some embodiments of the present disclosure, the electromagnets 8B comprising the double linear magnetic array A5, may have small permanent magnets 6 embedded into their ferromagnetic cores. As described previously, this has the benefit of increasing both the magnetic flux towards the operational side during the 'ON' state and increasing the residual magnetic field present in the case where the electromagnets are turned off.

Figure 36:
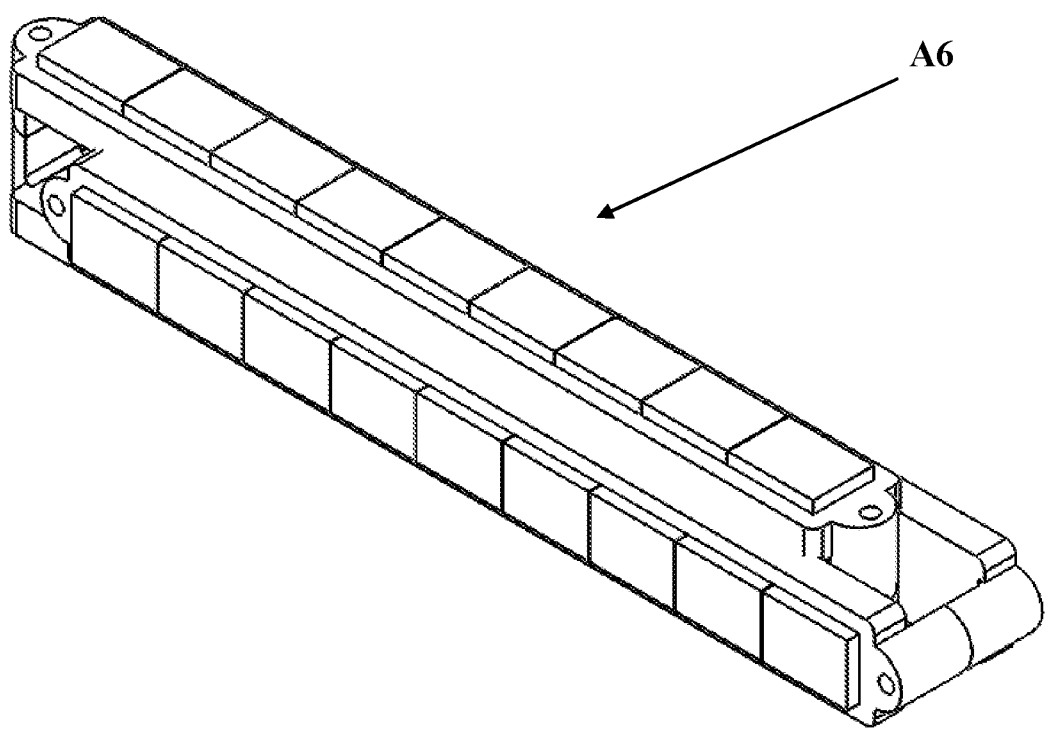
FIG. 36 depicts an isometric view of a quadruple linear magnetic array comprised of both permanent magnets and eight double-sided electromagnets affixed to a four-sided stator, according to a further example implementation of the disclosure, the quadruple linear magnetic array being functionally equivalent to having two linear magnetic arrays back-to-back in two planes, for a total of four linear magnetic arrays.
Figure 37:
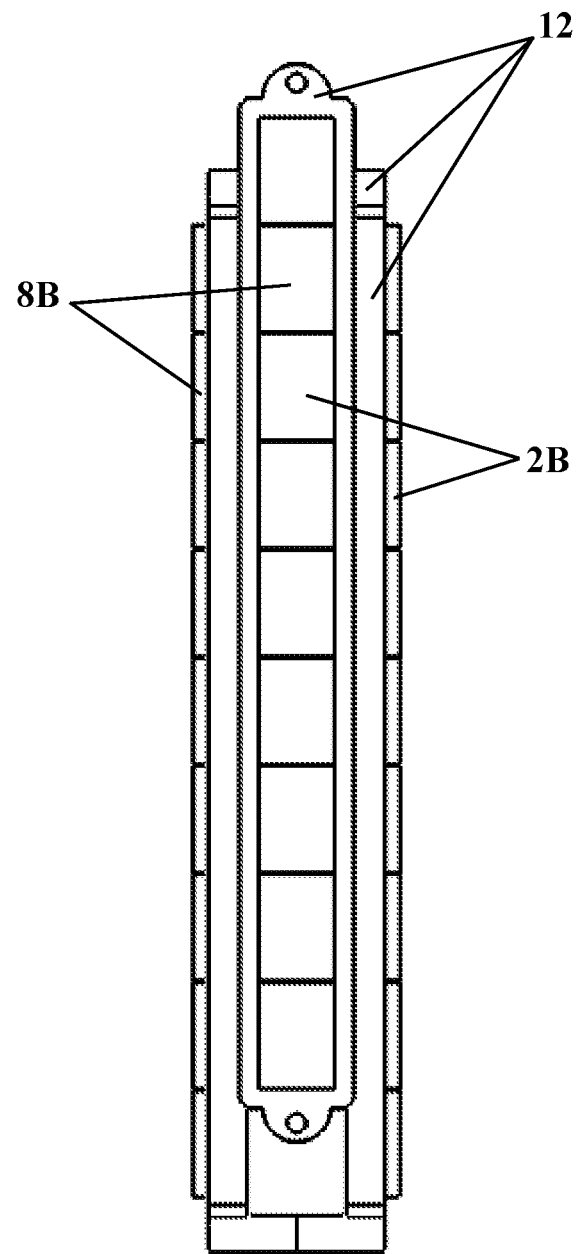
FIG. 37 depicts a side view of the quadruple linear magnetic array of FIG. 36.
Figure 38:
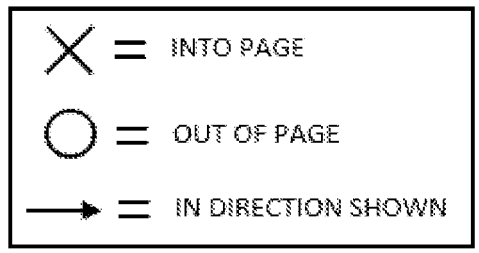
FIG. 38 depicts a sectional side view of the quadruple linear magnetic array of FIG. 36, showing small permanent magnets embedded into the ferromagnetic cores of the electromagnets, with magnetic orientation shown that is representative of an 'ON' state.
Figure 38:
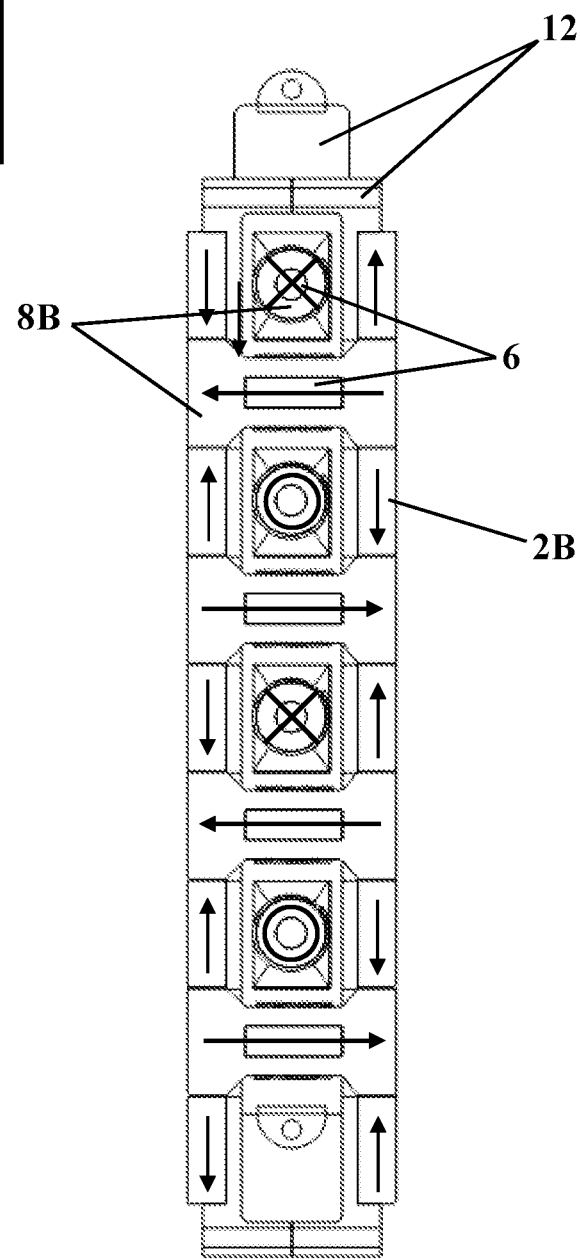

Referring to FIGS. 36, 37, and 38, in some embodiments of the present disclosure, two double linear magnetic arrays A5 can be combined such that a quadruple linear magnetic array A6 is formed. The system still operates on the exact same principles as the previous embodiments however this would allow for a magnetic flux to be emanated in two planes and would therefore prove useful in the case where a rotating conductor is operating.

Referring to FIG. 38, a cross-sectional view of the quadruple linear magnetic array A6 is shown along with the magnetic orientation of both the permanent magnets 2B and double-sided linear electromagnets 8B. The figure is representative of the 'ON' state, meaning that the magnetic flux will be coming out of the page, towards the operational side. As can be seen, the small permanent magnets 6 discussed previously are also present within the quadruple linear magnetic array A6, and they act in the same direction as the double-sided linear electromagnet 8B in which they are housed.

Figure 39:
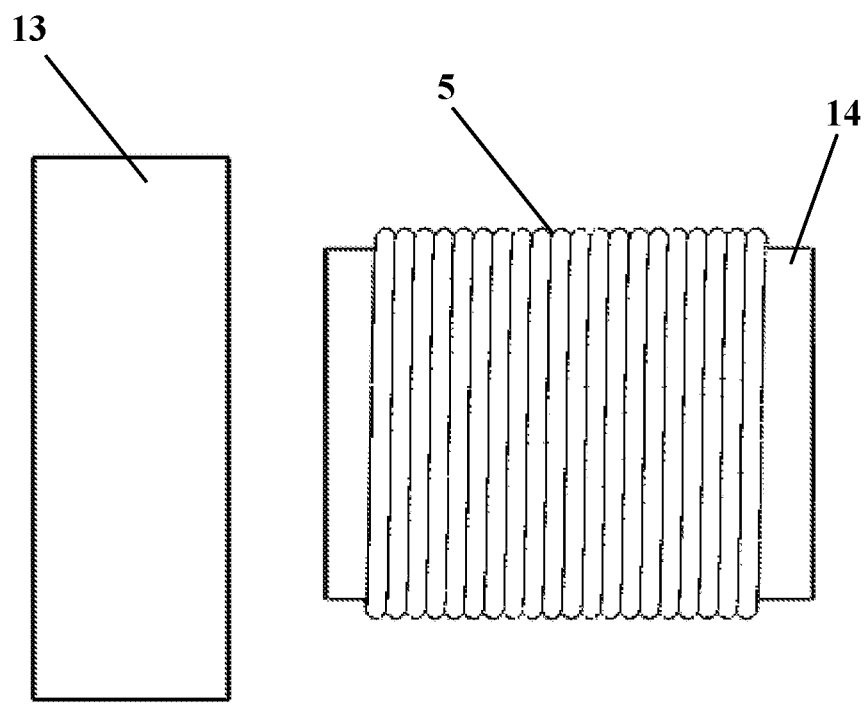
FIG. 39 depicts a side view of an individual modular electromagnet which may be used in the magnetic arrays of the preceding figures, according to example embodiments.

Referring to FIG. 39, in some embodiments of the present disclosure, the standard electromagnets 1A, 1B, 8A, 8B which are all a single manufactured piece, may be replaced with a modular electromagnet, comprising a removable head 13 and a matching ferromagnetic core 14 which can be attached together to form a functioning electromagnet. This modular addition may allow for the same ferromagnetic core 14 to be used with varying removable head 13 shapes, which would prove beneficial since if a different pole projection area is desired, the only change required would be to alter the removable head 13 and reuse the same ferromagnetic core 14, as opposed to having to manufacture an entirely new, whole electromagnet.

In at least some example embodiments, hybrid permanent magnet-electromagnet magnetic flux devices of the configurations described above can be incorporated into an eddy current brake assembly. For example, the circumferential hybrid permanent magnet-electromagnet arrays described herein can be incorporated as the permanent magnet-electromagnet array stator in one or more of the braking systems disclosed in United States Patent Application Publication US2020/0300310A1 (U.S. patent application Ser. No. 16/826,260), incorporated herein by reference.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following clauses.

The invention claimed is:

1. A hybrid permanent magnet-electromagnet flux device comprising:
a plurality of electromagnets and permanent magnets cooperatively arranged to provide a first magnetic array such that when the electromagnets are activated in a first state the first magnetic array of magnets implements a Halbach array generating an augmented magnetic field on a first side of the first magnetic array and a cancelling magnetic field on opposite facing second side of the first magnetic array, and when the electromagnets are activated in a second state a respective magnetic field orientation of each of the electromagnets is reversed from that of the first state.

2. The hybrid permanent magnet-electromagnet flux device of claim 1 comprising a controller configured to selectively cause the electromagnets to be placed in one of: the first state, the second state, or a neutral state, wherein in the neutral state the electromagnets are not activated.

3. The hybrid permanent magnet-electromagnet flux device of claim 1 wherein the plurality of electromagnets and permanent magnets are cooperatively arranged such that when the electromagnets are activated in the second state the first magnetic array implements a cancelling magnetic field on the first side of the first magnetic array.

4. The hybrid permanent magnet-electromagnet flux device of claim 3 wherein the plurality of electromagnets and permanent magnets are cooperatively arranged such that when the electromagnets are activated in the second state the first magnetic array implements a Halbach array generating an augmented magnetic field on the second side of the first magnetic array.

5. The hybrid permanent magnet-electromagnet flux device of claim 4 wherein the first magnetic array has a same number of the electromagnets as the permanent magnets, and the electromagnets and permanent magnets are radially arranged in an alternating pattern to form a circular surface at the first side of the first magnetic array.

6. The hybrid permanent magnet-electromagnet flux device of claim 5 wherein the first magnetic array has a total of eight of the electromagnets and eight of the permanent magnets.

7. The hybrid permanent magnet-electromagnet flux device of claim 1, wherein the first magnetic array has a total of four of the electromagnets and twelve of the permanent magnets.

8. The hybrid permanent magnet-electromagnet flux device of claim 1 wherein at least some of the electromagnets have a respective permanent magnet embedded into a ferromagnetic core thereof and oriented to augment the magnetic field on the first side of the array.

9. The hybrid permanent magnet-electromagnet flux device of claim 8 wherein at least some of the electromagnets are modular units with a detachable side to enable an orientation of the permanent magnet embedded in the electromagnet to be manually reversed.

10. The hybrid permanent magnet-electromagnet flux device of claim 1, wherein the plurality of electromagnets and permanent magnets are cooperatively arranged to provide a second magnetic array in back-to-back alignment with the first magnetic array, such that when the electromagnets are activated in the first state the second magnetic array implements a second Halbach array generating an augmented magnetic field on a first side of the second magnetic array that faces in an opposite direction than the first side of the first magnetic array and a cancelling magnetic field on a second side of the second first magnetic array that faces the second side of the first magnetic array.

11. The hybrid permanent magnet-electromagnet flux device of claim 10 wherein a first set of the permanent magnets form part of the first magnetic array and a second set of the permanent magnets form part of the second magnetic array, the plurality of electromagnets being double-sided electromagnets that each have a first electromagnet side forming part of the first magnetic array and a second electromagnetic side forming part of the second magnetic array.

12. The hybrid permanent magnet-electromagnet flux device of claim 11 wherein the first magnetic array is formed from an equal number of the permanent magnets and first electromagnet sides of the electromagnets, and the second magnetic array is formed from the same equal number of the permanent magnets and second electromagnet sides of the electromagnets, a total number of the electromagnets included in the plurality of electromagnets and permanent being half that of the permanent magnets.

13. The hybrid permanent magnet-electromagnet flux device of claim 11, the plurality of electromagnets and permanent magnets being cooperatively arranged such that each of the first magnetic array and the second magnetic array are circumferential arrays.

14. The hybrid permanent magnet-electromagnet flux device of claim 11 wherein the plurality of electromagnets and permanent magnets are arranged such that each of the first magnetic array and the second magnetic array are linear arrays.

15. The hybrid permanent magnet-electromagnet flux device of claim 14 wherein the plurality of electromagnets and permanent magnets are cooperatively arranged to provide a third magnetic array in back-to-back alignment with a fourth magnetic array, the third and fourth magnetic arrays being linear arrays in orthogonal alignment with the first and second magnetic arrays, such that when the electromagnets are activated in the first state: the third magnetic array implements a third Halbach array generating an augmented magnetic field on a side of the third magnetic array that faces in an orthogonal direction of the first side of the first magnetic array and the first side of the second magnetic array; and the fourth magnetic array implements a fourth Halbach array generating an augmented magnetic field on side of the fourth magnetic array that faces in an opposite direction that the third Halbach array.

16. The hybrid permanent magnet-electromagnet flux device of claim 1 where the plurality of electromagnets and permanent magnets are arranged on a stator that is configured to be secured to a structure.

17. The hybrid permanent magnet-electromagnet flux device of claim 1 wherein the plurality of electromagnets and permanent magnets are cooperatively such that when the electromagnets are activated in a first state the augmented magnetic field is generated to project perpendicular to the first side of the first magnetic array, and when the electromagnets are in a neutral state and not activated a magnetic field parallel to the first side of the first magnetic array is generated.

18. The hybrid permanent magnet-electromagnet flux device of claim 1 wherein a ratio of the permanent magnets to the electromagnets is selected from the group consisting of: 1:1, 3:1 and 6:1.

19. A method of operating a hybrid-permanent magnet electromagnet flux device that comprises a plurality of electromagnets and permanent magnets cooperatively arranged to provide a first magnetic array such that when the electromagnets are activated in a first state the first magnetic array of magnets implements a Halbach array generating an augmented magnetic field on a first side of the first magnetic array and a cancelling magnetic field on opposite facing second side of the first magnetic array, and when the electromagnets are activated in a second state a respective magnetic field orientation of each of the electromagnets is reversed from that of the first state, the method comprising: applying current in one direction to induce a first polarity to the plurality of electromagnets to activate the electromagnets in the first state; and applying current in the reverse direction to induce an opposing polarity to activate the electromagnets in the second state.

* * * * *